US011063982B2

(12) United States Patent
Di Domenico et al.

(10) Patent No.: US 11,063,982 B2
(45) Date of Patent: Jul. 13, 2021

(54) OBJECT SCOPE DEFINITION FOR ENTERPRISE SECURITY MANAGEMENT TOOL

(71) Applicant: Unisys Corporation, Blue Bell, PA (US)

(72) Inventors: Michael Di Domenico, Malvern, PA (US); Robert A. Johnson, Malvern, PA (US); Philippe Jolly, Schipol Rijk (NL); Michael C. Leap, Malvern, PA (US); Richard W. Phelps, Cary, NC (US); Emily M. Shoup, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 355 days.

(21) Appl. No.: 16/258,220

(22) Filed: Jan. 25, 2019

(65) Prior Publication Data

US 2020/0244701 A1 Jul. 30, 2020

(51) Int. Cl.
| | |
|---|---|
| *H04L 29/06* | (2006.01) |
| *H04L 29/08* | (2006.01) |
| *G06F 21/60* | (2013.01) |
| *H04L 12/24* | (2006.01) |

(52) U.S. Cl.
CPC ............ *H04L 63/20* (2013.01); *G06F 21/604* (2013.01); *H04L 41/0893* (2013.01); *H04L 41/28* (2013.01); *H04L 63/06* (2013.01); *H04L 63/102* (2013.01); *H04L 63/104* (2013.01); *H04L 67/02* (2013.01); *H04L 67/30* (2013.01)

(58) Field of Classification Search
CPC ..... H04L 63/20; H04L 41/0893; H04L 41/28; H04L 63/06; H04L 63/102; H04L 63/104; H04L 67/02; H04L 67/30; G06F 21/604
See application file for complete search history.

(56) References Cited

U.S. PATENT DOCUMENTS

| | | | |
|---|---|---|---|
| 2009/0135793 A1* | 5/2009 | Nandagopal | ...... H04L 29/12311 370/338 |
| 2017/0195162 A1* | 7/2017 | Enrique Salpico | .......................... H04L 29/06149 |
| 2018/0255092 A1* | 9/2018 | Thubert | .............. H04L 61/1511 |

* cited by examiner

*Primary Examiner* — Arvin Eskandarnia

(57) ABSTRACT

Methods and systems for configuring a common security policy for a plurality of nodes included within an enterprise network. Example methods can include grouping nodes within profiles based on IP address, in addition to concordance data. Additionally, nodes may be added to profiles based on a classification of the node being common to classifications of nodes within the profile. Still further, profiles may be grouped into a solution based at least in part on classification of the profile, in addition to grouping of profiles into solutions based on affinitization using concordance data. The methods described also include determining a common security policy to apply to each of the nodes within the profile.

22 Claims, 13 Drawing Sheets

OBJECT SCOPE DEFINITION FOR ENTERPRISE SECURITY MANAGEMENT TOOL

BACKGROUND

Robust enterprise security software is complex. It often requires installation of specific security software packages at each trusted computer associated with the enterprise, as well as management of various profiles for each of a number of different types of users having differing roles. Furthermore, each server within an enterprise network will typically have a collection of allowed connections external to the network to be managed.

The complexity of enterprise security software increases with the level of security required. For example, in enterprise networks in which data must be secured during intra-network storage and/or transmission, detailed definitions regarding a level of security for each user, types of encryption, permissions, and other policies must be set. Because there are often a large number of computing systems within such an enterprise network, provisioning each system can become so complex as to be time- and cost-prohibitive to install such enterprise security software, or at the very least to exploit its full capabilities. Although network security administrators may find some ways to simplify the deployment of a security solution, for example by creating a template image of security software that can then be customized for each server or endpoint to be provisioned, this still requires each endpoint to be custom provisioned by the network security administrator, which remains time-intensive. In addition, current network security management tools intended to ease the burden of deployment, modifying, and maintaining specific security policies across the enterprise network require substantial knowledge of the specifics of network members, and don't allow for simplified control of the application of specific policies to be applied to network members based on user-defined characteristics.

Furthermore, for network security administrators in organizations that are first installing enterprise security software, it can be difficult, if not impossible, to know what specific policies should be created and how to create or deploy such policies within their existing network. Substantial training and weeks, if not months, of deployment/implementation operations are therefore required in many such situations.

SUMMARY

In summary, the present disclosure relates to methods and systems for implementing a secure migratable architecture having improved flexibility, performance, security, and availability.

In a first aspect, a system includes an enterprise security management configuration server. The enterprise security management configuration server includes a programmable circuit and a memory storing computer-executable instructions. When executed by the programmable circuit, the computer-executable instructions cause the enterprise security management configuration server to associate one or more IP addresses with at least one profile within an enterprise security management configuration tool. Further, for each of the nodes included within the enterprise network, the computer-executable instructions cause the enterprise security management configuration server to determine whether an IP address of the node corresponds to at least one of the one or more IP addresses associated with the at least one profile, and based on the IP address of the node corresponding to at least one of the one or more IP addresses associated with the profile, add the node to the at least one profile. Further still, the computer-executable instructions cause the enterprise security management configuration server to affinitize one or more of the plurality of nodes into one or more profiles based on network concordance data, the one or more profiles including the at least one profile associated with the one or more IP addresses, and determine a common security policy to apply to each of the nodes within the at least one profile.

In a second aspect, a system includes an enterprise security management configuration server. The enterprise security management configuration server includes a programmable circuit and a memory storing computer-executable instructions. When executed by the programmable circuit, the computer-executable instructions cause the enterprise security management configuration server to associate a classification with a profile within an enterprise security management configuration tool. Further, for each of the nodes included within the enterprise network, the computer-executable instructions cause the enterprise security management configuration server to determine whether a classification of the node corresponds to the classification associated with the profile, and based on the classification of the node corresponding to the classification associated with the profile, add the node to the profile. Further still, the computer-executable instructions cause the enterprise security management configuration server to affinitize one or more of the plurality of nodes into one or more profiles based on network concordance data, the one or more profiles including the profile associated with the classification, and determine a common security policy to apply to each of the nodes within the profile.

In a third aspect, a method of configuring a common security policy to a plurality of nodes included within an enterprise network is disclosed. The method includes associating one or more IP addresses with at least one profile within an enterprise security management configuration tool. The method further includes, for each of the nodes included within the enterprise network, determining whether an IP address of the node corresponds to at least one of the one or more IP addresses associated with the at least one profile, and based on the IP address corresponding to at least one of the one or more IP addresses, adding the node to the at least one profile. The method further includes affinitizing one or more of the plurality of nodes into one or more profiles based on network concordance data, the one or more profiles including the at least one profile associated with the one or more IP addresses, and determining a common security policy to apply to each of the nodes within the at least one profile.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
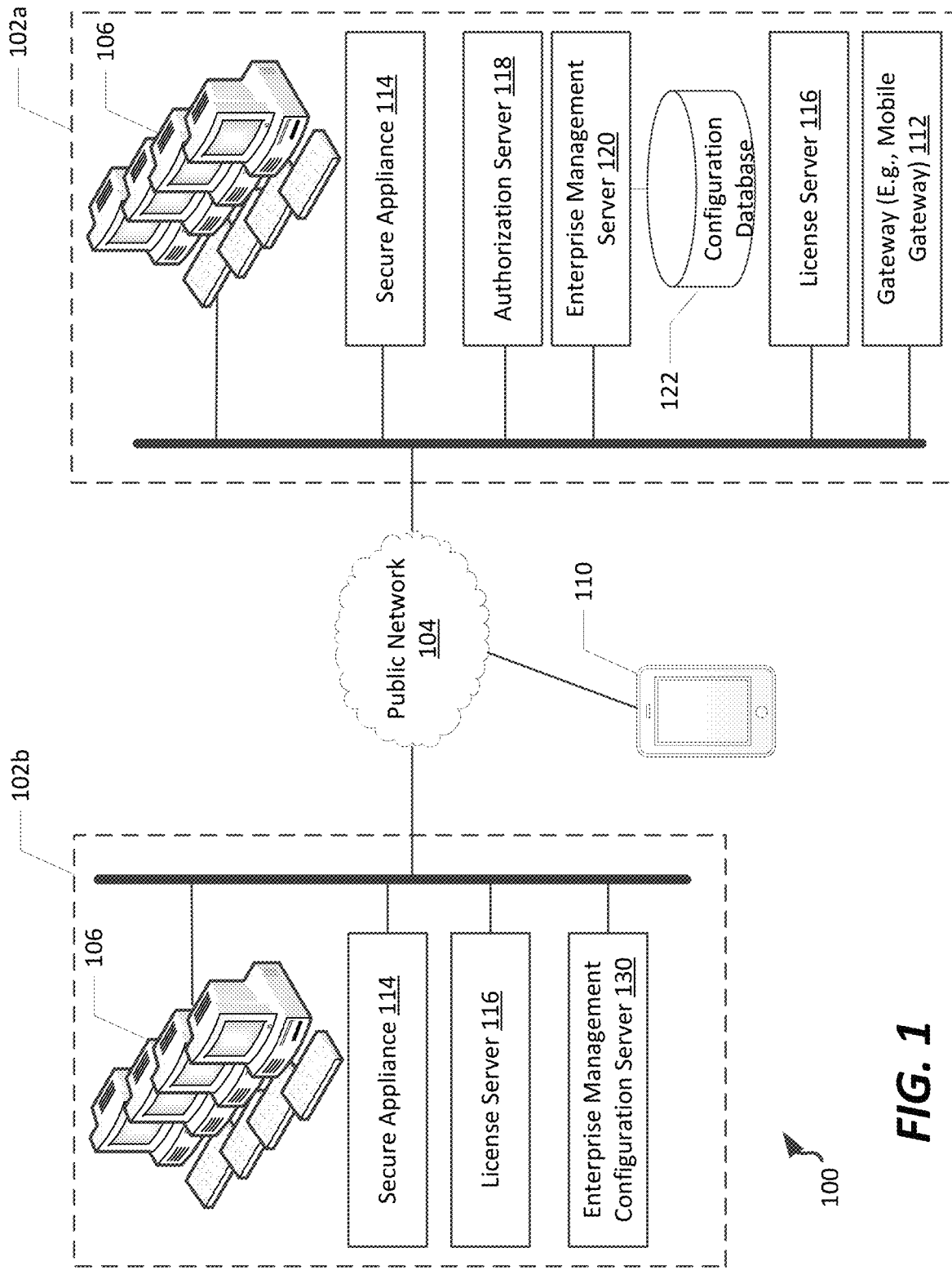
FIG. 1 illustrates a schematic view of an enterprise network distributed across premises, representing an example network in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to an enterprise security management tool, including certain user interface features allowing user input defining endpoint associations based on IP address and classification to provide additional control of security settings while maintaining simplicity, that can be used to assist in configuring security settings within an enterprise without requiring a user to have substantial knowledge regarding (1) what types of security settings might be appropriate for each of a number of differently situated endpoints within the enterprise, or (2) whether specific endpoints should be provisioned similarly or differently, where those endpoints might operate similarly, but not identically. The configuration tool described herein allows for a simple graphical configuration to be made and translated into a format that can be populated to an enterprise security management database, and into an enterprise network.

Additionally, the systems and methods of the present disclosure provide advantages in the area of simplicity regarding setting up and/or modifying security settings for similarly situated endpoints. This is because, if each endpoint is considered, and graphically depicted, independently, it can be confusing and time consuming to select and modify permissions or other settings properly for all endpoints. By graphically grouping endpoints by affinity and allowing for simplification of a graphical arrangement of those endpoints, modification and provisioning of endpoints is simplified greatly, and made possible for personnel having less knowledge regarding an enterprise's network topology.

In some embodiments of the present disclosure, the enterprise security management tool, or configuration tool, described herein also provides advantages in terms of defining coordinated policies not just for similarly situated endpoints, but for cooperative endpoints, such as user devices, database servers, and associated web servers. In some such example embodiments, the enterprise security management tool can form "solutions" either automatically or by manual manipulation of graphical elements representing such endpoints. Such solutions may correspond, for example, to a collection of functionally interrelated endpoints for which it may be desirable to coordinate security settings. Solutions can be a group of profiles that solve or address a particular problem or service. In example arrangements, such solutions can be arranged in a hierarchy including providers and consumers of data or services, in order. Automatic detection of such solutions can be based, for example, on observed traffic illustrating such functional relationships, and a process by which a root node (e.g., endpoint) can be defined, followed by interconnected nodes interacting with that root node. The root node can be, for example, a database server, a web server, or other primary source of information with which other nodes interact.

In addition to the above, certain user interface features provide additional guidance and simplicity to a user of the enterprise security management tool. For example, although specific affinity levels or solutions might be automatically defined, manipulation of a graphical user interface to adjust interrelationships among nodes, to group or ungroup similarly situated nodes, to create or decouple solutions, or other movements, can be defined to counteract an otherwise automated or default configuration, such that the manual adjustment is persisted through subsequent manipulations of nodes. Furthermore, the automated and manual manipulations of nodes can represent changes to security settings that are propagated, via underlying metadata, to a security settings file that can be imported into an enterprise security database for purposes of provisioning an enterprise network.

In some embodiments of the present disclosure, the enterprise security management tool, or configuration tool, described herein also provides advantages in terms of defining coordinated policies for not only similarly situated and/or cooperative endpoints, but also for defining coordinated policies for endpoints having certain IP addresses or IP address ranges, and/or having certain predetermined classifications. Certain user interface features provide additional control and simplicity by allowing user input defining such IP addresses or ranges and classifications and automatically regrouping or sorting the graphical arrangement of nodes and/or profiles.

I. Enterprise Security Configuration Server and Environment

Enterprises implementing security systems in which traffic among nodes within the enterprise network is secured must be configured using complex security policies that are coordinated to ensure that the various endpoints, or nodes, have access to various system resources that may be needed by that node or endpoint. One example of such a security system that can be implemented is the Stealth enterprise security solution from Unisys Corporation of Blue Bell, Pa. Generally, such a system is implemented using an enterprise management server that maintains security policies for various network endpoints, and distributes security policies to those endpoints, in terms of encryption keys that define communities of interest within the enterprise as well as filter lists identifying permitted and forbidden traffic patterns from each endpoint. One particular attribute of the Stealth solution is that for entities not included within a particular community of interest, the resource that is protected using that solution is not visible, and therefore would not be a hacking target (e.g., for DDOS attacks, or other types of attacks) given that its network address would not be known.

As noted above, solutions for creating enterprise security policies, are complex. As such, an enterprise security configuration server is proposed to be included in example networks in which such security deployments are performed, which can create solutions for import into an enterprise server for distribution across an enterprise in a straightforward manner. Furthermore, such solutions must always be kept up to date and correct so that the solutions can be successfully deployed. Any conflicts of IP addresses or classifications of nodes or profiles must be fixed immediately by network security administrators or other appropriate organization personnel. FIGS. 1-5 illustrate example computing systems useable to implement an enterprise network and deploy security settings in such a network. FIG. 6 generally introduces an enterprise security management tool process flow that simplifies such design and deployment. FIGS. 7-13 illustrate example enterprise security management tool processes and configuration user interfaces for associating IP addresses and classifications with profiles and solutions.

Referring now to FIG. 1, a schematic view of one example enterprise network 100 is illustrated. The enterprise network 100 is distributed across premises, and therefore includes at least a first premises 102a and a second premises 102b separated by a network 104, which can in some cases represent an at least partially public network, such as the Internet. The enterprise network 100 includes a plurality of endpoints 106. The endpoints 106 can be, for example, servers or workstations operable or accessible by a user to perform various tasks germane to the enterprise.

Users of such endpoints in this context may be associated with the enterprise and may be afforded access to computing resources at the endpoints 106; in such cases, different users may have different access rights to data or resources included in the enterprise. Accordingly, users are, via a management system, separated into defined communities of interest (COIs) which allows for common access rights to a group of users. The common access rights may be, in a corporate context, access rights associated with a particular department or project; in other contexts, access rights may be defined by a particular security clearance, membership in a particular group, or having a particular interest in common data or applications.

In the embodiment shown, each of the premises 102a-b have a plurality of endpoints 106 located within the premises. In such arrangements, the endpoints 106 can be interconnected at each of the premises using standard communications equipment (not shown) such as routers, switches, and cabling. In some embodiments, the endpoints 106 can be virtualized endpoints maintained on one or more servers. In such cases, one possible implementation of such an arrangement could be provided using s-Par® Secure Partitioning firmware provided by Unisys Corporation of Blue Bell, Pa. Other virtualization systems could be used as well.

It is noted that, in addition to endpoints 106 at premises 102a-b, other access mechanisms to the enterprise network 100 may be desirable as well. For example, in the embodiment shown a mobile device 110 may be used to access data or computing resources of the enterprise. In some embodiments, the mobile device 110 can establish a secure connection with a mobile gateway, such as gateway 112 which can act as a proxy for the mobile device 110 within the network, including receiving access to other endpoints within the network based on a community of interest of the user associated with the mobile device 110.

Referring to the premises 102a-b generally, it is noted that in some embodiments, each premises may include a secure appliance 114. The secure appliance can manage secure communications among endpoints 106 or between premises 102a-b. In example embodiments, the secure appliance 114 can be used to deliver encryption keys or encryption features (e.g., a driver with which endpoints can secure data for communication) for endpoints. In alternative embodiments, the secure appliance 114 may not be needed by some or all endpoints; in such arrangements, a native security feature, such as IPsec, could be used by the endpoints to ensure security within a premises 102, or between premises 102a-b generally. In such cases, encryption keys and standards can be defined centrally, for example using the management server described herein, to establish different keys and different communities of interest for use by the authorized users of endpoints across the premises 102a-b.

Additionally, in the embodiment shown, one or both premises 102a-b can include a license server 116. The license server 116 can manage and track license usage by the endpoints 106. For example, one or more endpoints 106 may request a license to particular software or to a particular network resource. In such cases, the license server 116 can be contacted to grant or deny a license to such software or resource, based on a number of licenses available and whether the user of the endpoint is authorized to use such software or resource.

Also, in the embodiment shown, an authorization server 118 can be provided at one or more of the premises 102a-b. The authorization server 118 can be accessed by an endpoint that is seeking authorization to access other resources within the network. Generally, the authorization server 118 can establish a secure communication session with that endpoint to provide authorization information (keys, settings, COI filters, etc.) to allow that endpoint to communicate with other endpoints within the network.

In addition to the above, a management server 120 is located at one of the premises 102*a-b*. The management server 120 provides a universally-accessible access location at which management settings can be viewed, enterprise access attempts logged, license tracking can be managed, and security arrangements defined, including definition of encryption policies, communities of interest, enterprise resources available, and other features. In example embodiments, one or more instances of the authorization server 118 can be hosted on the management server; other instances of the authorization server (if multiple authorization servers are provided) can be hosted on other computing systems within the enterprise network. Additional details regarding operation of the management server are described in U.S. patent application Ser. No. 14/688,348, entitled "Enterprise Management for Secure Network Communications over IPSec", assigned to Unisys Corporation of Blue Bell, Pa., the disclosure of which is hereby incorporated by reference in its entirety.

Generally, the management server 120 is communicatively connected to a configuration database 122 (e.g., by hosting the configuration database or being communicatively connected to a separate computing system or systems that host that database). The configuration database generally stores configuration settings included in one or more configuration profiles for the enterprise network; and one or more interface definitions useable by the web interface to provide administrative access to the configuration settings. Details regarding the data stored in the configuration database are provided in U.S. patent application Ser. No. 14/688,348, entitled "Enterprise Management for Secure Network Communications over IPSec", the disclosure of which was previously incorporated by reference.

Enterprise management within the enterprise network 100 can be distributed among one or more of the management server 120, authorization server 118, license server 116, and secure appliance 114. Enterprise management provides the general management and control for servers using the Stealth security features of an enterprise network, and in particular Stealth installations that apply IPsec-based security. Each enterprise network, or enclave, can have a management instance that performs various user authentication, logging, licensing, certificate management, administration, web services, and software update features. Regarding authorization, the management service can ensure that a user is authenticated and authorized when logging on to the endpoint 106. The endpoint 106 receives an Authorization Token (AuthToken) that identifies the user's COI membership status.

The management server 120 hosts a management service that can also receive log information to be recorded, and can issue commands to the server to control its behavior or to request status information. This includes retrieving debugging information regarding security software installed through the enterprise. The management service also controls licensing, for example by installing a license System Control Number (SCN) and license values (strings) on a license host, such as either the management server 120 or the authorization server 118. Remote authorization servers, such as authorization server 118, communicate with a license host to share its licenses. The management service also performs certificate management to maintain the certificates used for authentication.

Administrative users of the enterprise network 100, and management server 120 specifically, will use a GUI to control account management, role-based authorization, certificate management, and other administrative tasks. In some embodiments, a web services interface is provided to allow network access to management services. Additionally, the enterprise management features of the present disclosure are configurable to inventory levels of installed software and provide for software updates. This may include updates for endpoints as well as the management service itself.

In addition to the above, an enterprise management configuration server 130 can be included within the enterprise network 100. The enterprise management configuration server 130 generates a user interface at which security policies can be generated, for import into the management server 120 and configuration database 122. Although shown at premises 102*b*, it is understood that the enterprise management configuration server 130 could be located at a same location as the management server 120, or indeed be implemented on the same physical computing system as the management server 120, in alternative implementations.

In general, although the enterprise network 100 as shown is disclosed as having a plurality of premises 102*a-b* and a single management server 120, it is noted that other arrangements may exist in which management servers 120 can be distributed at one or more distributed locations, each of which are configured to communicate with an instance of the configuration database 122. Furthermore, one or more of those management servers 120 can be maintained as a redundant management server that is accessed in the event of failure of a primary management server. Additionally, since the management server 120 can be, in some embodiments, implemented as a process that executes within a computing environment, functionality of the management server can be combined with that of other systems on a single computing system or separated onto different computing systems; in some embodiments, a user interface server, management server, authorization server, license server, and/or other enterprise network security services can be located on separate servers, while in other embodiments two or more of these services can be combined on a single device (e.g., a discrete physical computing device or a virtual computing device installed on a partition of a physical computing device). Accordingly, enterprise management configuration server 130 can be configured to distribute security policy configurations to one or more management servers 120, or different security policies (or portions of a common security policy, as discussed further below) to different management servers.

Figure 2:
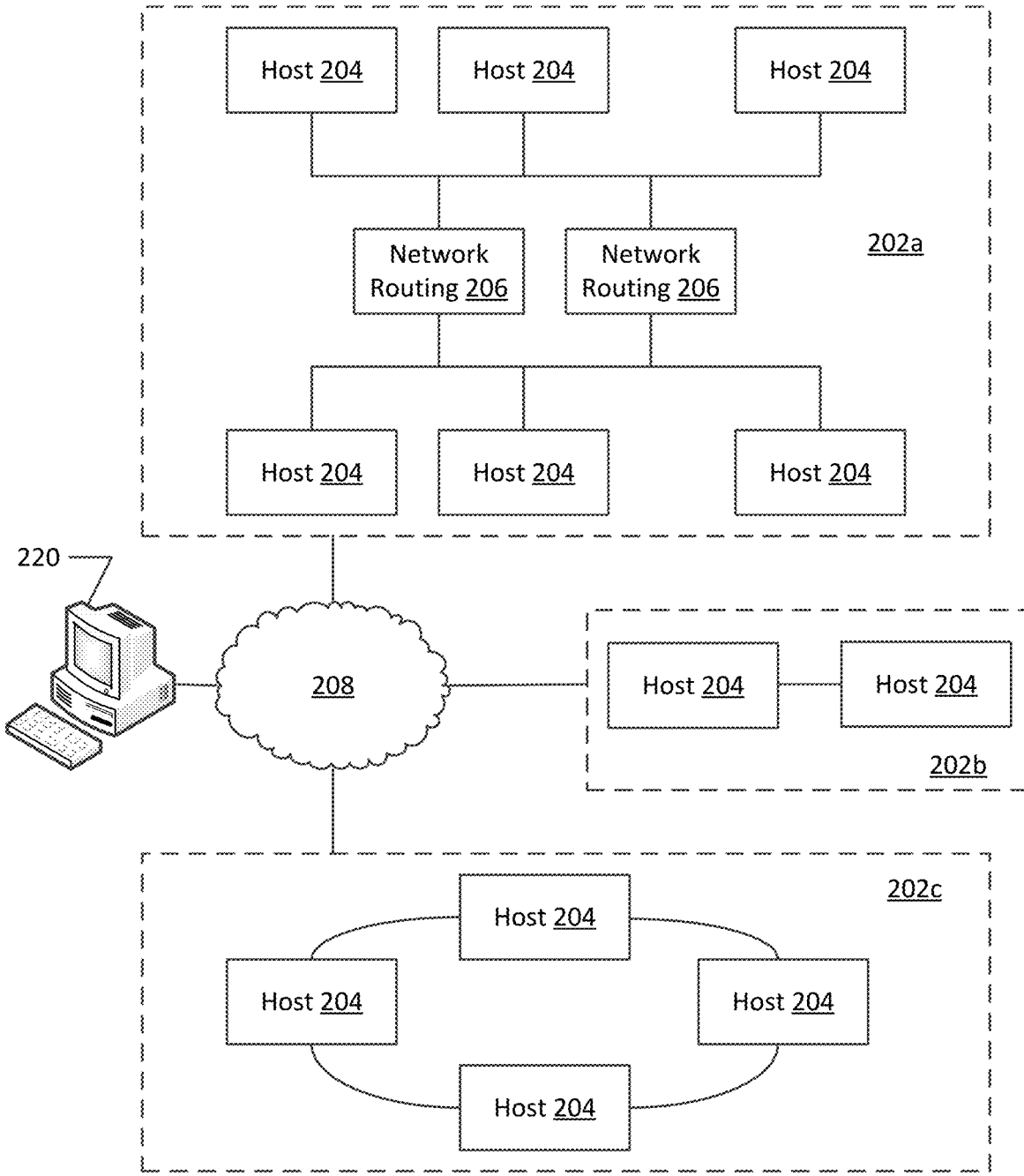
FIG. 2 illustrates a distributed multi-host system in which aspects of the present disclosure can be implemented.
Figure 3:
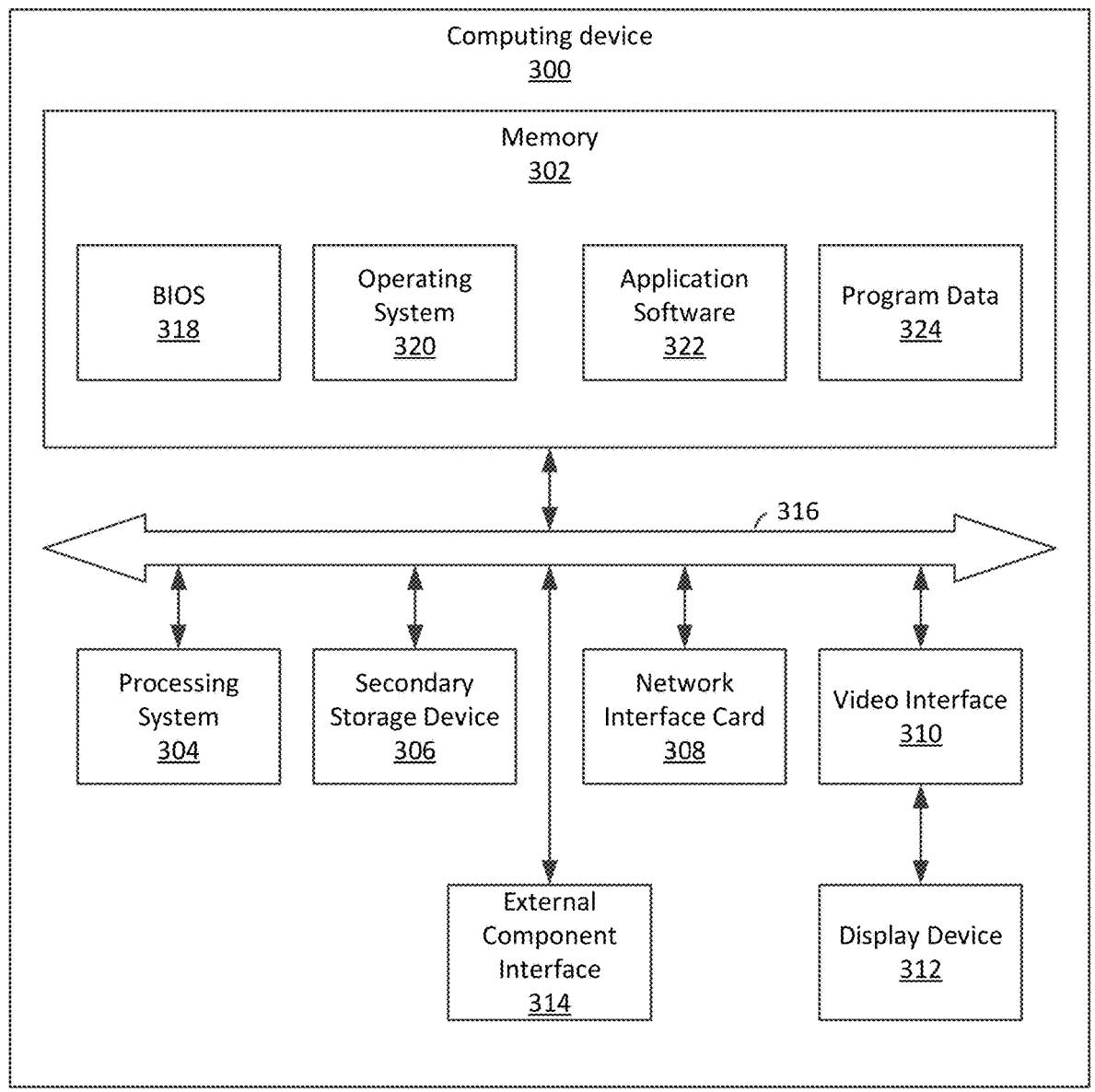
FIG. 3 is a schematic illustration of an example computing system in which aspects of the present disclosure can be implemented.

Referring now to FIG. 2, a distributed multi-host system 200 is shown in which aspects of the present disclosure can be implemented. The system 200 represents a possible arrangement of computing systems or virtual computing systems useable to implement the enterprise network of FIG. 1. In the embodiment shown, the system 200 is distributed across one or more locations 202, shown as locations 202*a-c*. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 202*a-c* each include one or more host systems 204, or nodes. The host systems 204 represent host computing systems, and can take any of a number of forms. For example, the host systems 204 can be server computing systems having one or more processing cores and memory subsystems and are useable for large-scale computing tasks. In one example embodiment, a host system 204 can be as illustrated in FIG. 3.

As illustrated in FIG. 2, a location 202 within the system 200 can be organized in a variety of ways. In the embodiment shown, a first location 202*a* includes network routing equipment 206, which routes communication traffic among the various hosts 204, for example in a switched network configuration. Second location 202*b* illustrates a peer-to-peer arrangement of host systems. Third location 202*c* illustrates a ring arrangement in which messages and/or data can be passed among the host computing systems themselves, which provide the routing of messages. Other types of networked arrangements could be used as well.

In various embodiments, at each location 202, the host systems 204 are interconnected by a high-speed, high-bandwidth interconnect, thereby minimizing latency due to data transfers between host systems. In an example embodiment, the interconnect can be provided by an IP-based network; in alternative embodiments, other types of interconnect technologies, such as an Infiniband switched fabric communications link, Fibre Channel, PCI Express, Serial ATA, or other interconnect could be used as well.

Among the locations 202*a-c*, a variety of communication technologies can also be used to provide communicative connections of host systems 204 at different locations. For example, a packet-switched networking arrangement, such as via the Internet 208, could be used. Preferably, the interconnections among locations 202*a-c* are provided on a high-bandwidth connection, such as a fiber optic communication connection.

In the embodiment shown, the various host system 204 at locations 202*a-c* can be accessed by a client computing system 220 such as the endpoints 106 of FIG. 1. The client computing system can be any of a variety of desktop or mobile computing systems, such as a desktop, laptop, tablet, smartphone, or other type of user computing system. In alternative embodiments, the client computing system 220 can correspond to a server not forming a cooperative part of a virtualization system such as the para-virtualization system described above, but rather which accesses data hosted on such a system. It is of course noted that various virtualized partitions within a para-virtualization system could also host applications accessible to a user and correspond to client systems as well.

It is noted that, in various embodiments, different arrangements of host systems 204 within the overall system 200 can be used; for example, different host systems 204 may have different numbers or types of processing cores, and different capacity and type of memory and/or caching subsystems could be implemented in different ones of the host system 204. Furthermore, one or more different types of communicative interconnect technologies might be used in the different locations 202*a-c*, or within a particular location.

Referring now to FIG. 3, a schematic illustration of an example discrete computing system in which aspects of the present disclosure can be implemented. The computing device 300 can represent, for example, a native computing system within which one or more of servers 116-120, 130 can be implemented, or an implementation of an endpoint 106, or mobile device 110 (a.k.a., nodes). In particular, the computing device 300 represents the physical construct of an example computing system at which an endpoint or server could be established. In some embodiments, the computing device 300 implements virtualized or hosted systems, and executes one particular instruction set architecture while being used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300. Example program data and application software is described below in connection with FIGS. 4-5.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

It is noted that, although in the embodiments of FIG. 3 shown the computing device 300 represents a physical computing system, the various endpoints and servers of the present disclosure need not be directly implemented on a hardware-compatible system. Rather, such endpoints or servers could be implemented within a virtual computing system or virtual partition of a computing system. In some embodiments, the endpoints and/or servers of the present disclosure are implemented in a partitioned, multiprocessor environment, with the various partitions in which endpoints and/or servers reside being managed by a system virtualization software package. One such system virtualization package is the Unisys Secure Partitioning (s-Par®) partitioning and virtualization system provided by Unisys Corporation of Blue Bell, Pa.

In general the endpoints of the present disclosure can be configured various ways, with registry settings selected to configure the endpoint to communicate according to an appropriate communication protocol. In some example embodiments, each IPv6-based system includes a capability to communicate with the authorization server via either IPv4 or IPv6 communications. Other administrator-selected IP-based protocols could be used as well.

Figure 4:
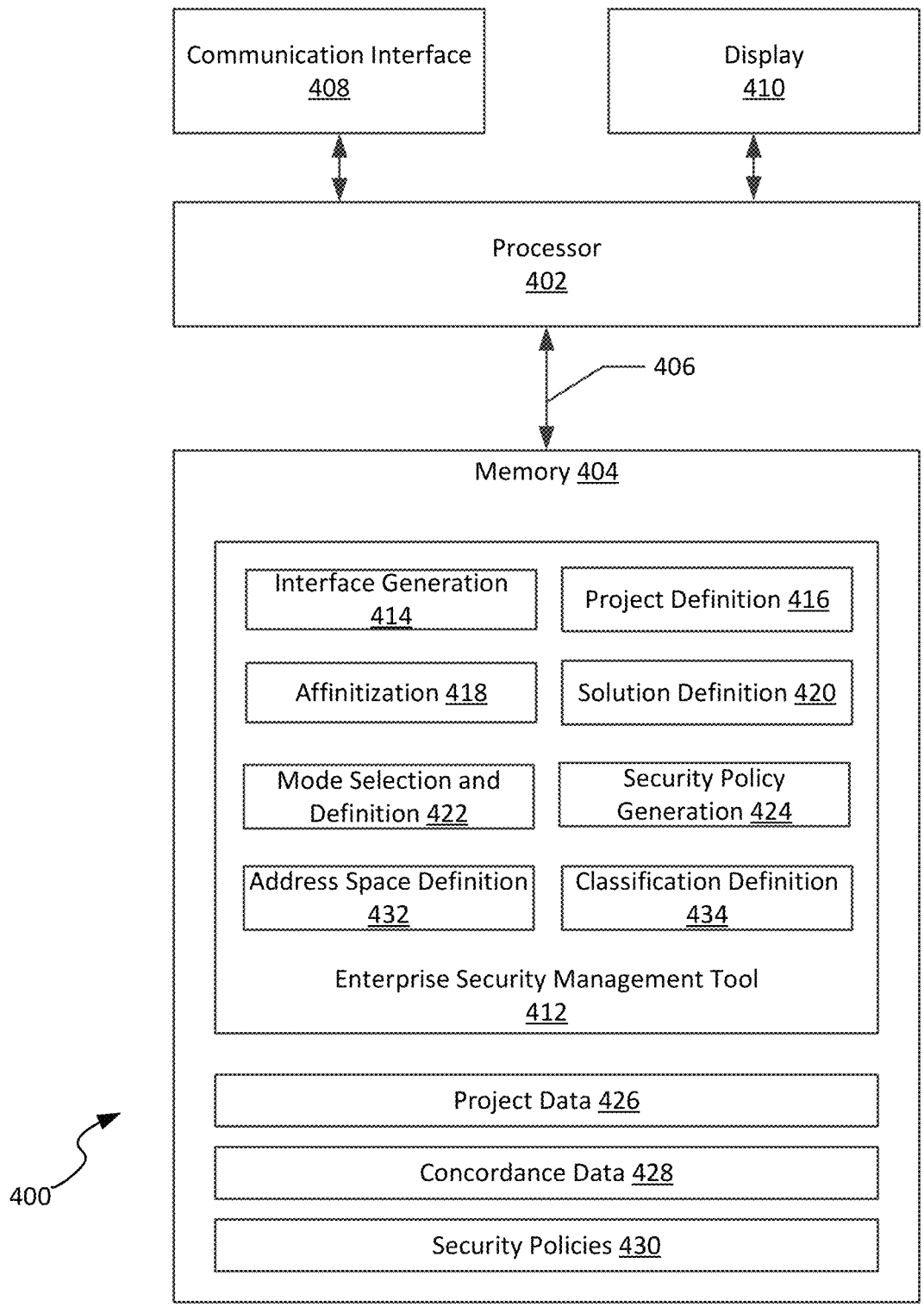
FIG. 4 is a schematic illustration of an example computing system useable within the enterprise network as an enterprise security management configuration server.

FIG. 4 is a schematic illustration of an example computing system useable within the enterprise network as an enterprise security management configuration server, such as the enterprise management configuration server 130 of FIG. 1.

In general, the computing system 400 includes a processor 402 communicatively connected to a memory 404 via a data bus 406. The processor 402 can be any of a variety of types of programmable circuits capable of executing computer-readable instructions to perform various tasks, such as mathematical and communication tasks, such as those described above in connection with FIG. 3. The memory 404 can include any of a variety of memory devices, such as using various types of computer-readable or computer storage media, as also discussed above. In the embodiment shown, the memory 404 stores a query formulation application 412, discussed in further detail below. The computing system 400 can also include a communication interface 408 configured to receive and transmit data, for example to access data in an external database, such as database 122 of FIG. 1, or to serve a web interface useable to configure security settings within an enterprise, as discussed herein. Additionally, a display 410 can be used for viewing a local version of a user interface, as described herein, via an enterprise security management tool 412.

In various embodiments, the enterprise security management tool 412 generally is configured to generate a configuration user interface accessible by a security administrator of an enterprise to simplify creation and deployment of security policies across the enterprise. In the example embodiment shown, the enterprise security management tool 412 includes an interface generation component 414, a project definition component 416, an affinitization component 418, a solution definition component 420, a mode selection and definition component 422, a security policy generation component 424, an address space definition component 432, and a classification definition component 434. As further outlined below, the memory 404 can include project data 426, concordance data 428, and security policies 430.

In example embodiments, the interface generation component 414 can be configured to generate and serve a configuration user interface. Details regarding such a configuration user interface are provided in U.S. patent application Ser. No. 15/494,852, entitled "Enterprise Security Management Tool", U.S. patent application Ser. No. 15/494,896, entitled "User Interface Features for Enterprise Security Management", each assigned to Unisys Corporation of Blue Bell, Pa., the disclosures of which are incorporated by reference in their entirety. The configuration user interface presents to a security administrator a simplified topology of an enterprise network, and allows for grouping of nodes (e.g., servers and endpoints) that are commonly secured using similar security policy settings, and allows for automatic grouping and default security settings to simplify security policy deployment. A project definition component 416 is configured to manage a project, which refers to a container for saved work associated with security configuration settings.

An affinitization component 418 is configured to determine an extent of similarity among nodes in an enterprise network, and in some embodiments group those nodes into "profiles" or collections of similar-acting nodes. For example, a profile may contain a set of application servers that serve a common application, or redundant database servers, or web servers, or even user endpoints having common communication patterns. Although the servers, or nodes, grouped into a profile may operate somewhat differently, in some embodiments (discussed in further detail below) the affinitization component can determine a level of similarity between nodes and group those nodes that have a similarity above a specified "affinitization threshold". That threshold may be set using a simple user interface feature, as further discussed below. Furthermore, affinitization can be set automatically using such a threshold, or can be set manually by grouping a set of nodes within a profile "container" that can be created using the configuration user interface. The grouped nodes within the profile can be treated similar to one another, by assigning a set of common security settings (e.g., common filter lists, security enablement/disablement, communities of interest, etc.). Details regarding such an affinitization are provided in U.S. patent application Ser. No. 15/494,869, entitled "Multi-Level Affinitization for Enterprise Security Management", assigned to Unisys Corporation of Blue Bell, Pa., the disclosure of which is incorporated by reference in its entirety.

A solution definition component 420 is configured to define one or more solutions in the configuration user interface. Each solution can be made up of one or more profiles (and likely a channel, indicating some communicative relationship between those profiles). While affinitized nodes in a profile will typically have common security settings because of common usage, profiles within a solution may have the same or only similar security settings based on the common data shared among those profiles, or that the profiles cooperate to serve end-users in a particular manner. In various embodiments, the solution definition component 420 can include an automated solution definition option in which the enterprise security management configuration tool identifies root and chained profiles that should be included in a solution or solutions in the enterprise network. In still further embodiments, the solution definition component 420 can also, or in the alternative, include a manual solution definition option in which the enterprise security management configuration tool allows a user to define a root profile and one or more chained profiles as part of a solution. Details regarding such a solution definition are provided in U.S. patent application Ser. No. 15/494,907, entitled "Solution Definition for Enterprise Security Management", assigned to Unisys Corporation of Blue Bell, Pa., the disclosure of which is incorporated by reference in its entirety.

A mode selection and definition component 422 is configured to allow a user to select from among a plurality of different modes in which the enterprise security management configuration tool can be used. For example, in a modeling mode (a default mode of the tool), a graphical user interface can be used to define security settings for export. However, a user may be presented with an option to switch to a simulation mode and/or a monitoring mode. In a simulation mode or monitoring mode, various tests can be run to verify consistency of security within the enterprise network, and alerts can be generated and graphically presented to a user to indicate areas of an enterprise network that are not secured, or for which unsecured traffic might be allowed to access data that is intended to be secured (either in a real-time or simulated situation, depending on the mode).

A security policy generation component 424 is configured to generate, based on the arrangement and settings defined using the configuration user interface of the enterprise security management configuration tool, an exportable file that can be ingested by the management server 120 of FIG. 1, for population of the configuration database 122 and subsequent dispersion of security policy settings throughout the enterprise network. In example embodiments, the security policy generation component 424 can generate such a file based on all or part of a given project, for example by generating a file that updates security settings for an entire enterprise network, for one or more solutions, or one or more profiles. In specific embodiments, the file is constructed such that it is compliant with an application programming interface (API) exposed by the management server 120 for modifying security settings in the configuration database 122.

An address space definition component 432 is configured to define one or more IP addresses associated with profiles and solutions in the configuration user interface. While affinitized nodes in a profile, will typically have common security settings because of common usage, the address space definition component 432 allows network security administrators to directly control the IP addresses allowed within a profile or solution, thereby manually overriding automatic groupings based on considerations not accounted for by an analysis of network traffic as provided for by affinitization. In various embodiments, the address space definition component 432 can include automatic inclusion of nodes within profiles and solutions having IP addresses or IP address ranges specified. In still further embodiments, the address space definition component 432 can also, or in the alternative, define IP addresses associated with profiles and solutions based on inclusion of specific nodes by a network configuration tool user either post- or pre-affinitization.

A classification definition component 432 is configured to define one or more classifications associated with profiles and solutions in the configuration user interface. Similar to address space definition component 432, the classification definition component 434 allows network security administrators to directly control the classifications allowed within a profile or solution, thereby manually overriding automatic groupings based on considerations not accounted for by an analysis of network traffic as provided for by affinitization. In various embodiments, the classification definition component 434 can include automatic inclusion of nodes within profiles and solutions having classifications specified. In still further embodiments, the classification definition component 434 can also, or in the alternative, define classifications associated with profiles and solutions based on inclusion of specific nodes by a network configuration tool user either post- or pre-affinitization.

In the embodiment shown, the memory 404 can be configured to also store project data 426, concordance data 428, and security policies 430. This information generally represents the input, current state, and output of the enterprise security management configuration tool as to one or more projects managed using that tool. Specifically, concordance data 428 can correspond to information regarding the identity and interactions of various endpoints and servers within an enterprise network. In some examples, a flow consists of a service having a consumer/provider relationship, defining a "friendship" between two nodes. In example embodiments, the concordance data, defining such flows and friendships, can include network logs captured at one or more endpoints, such as is discussed below in connection with FIG. 5. The project data 426 corresponds to a current state of a project, including any profiles (logical groupings of nodes), solutions (logical groupings of profiles), channels (communications detected between/among nodes and/or profiles), and/or any settings associated therewith, for example filter rules, security enablement/disenablement, or other security-based settings capable of being deployed by the management server 120. The security policies 430 correspond to the data output from the enterprise security management configuration tool, for ingestion by the management server 120.

Figure 5:
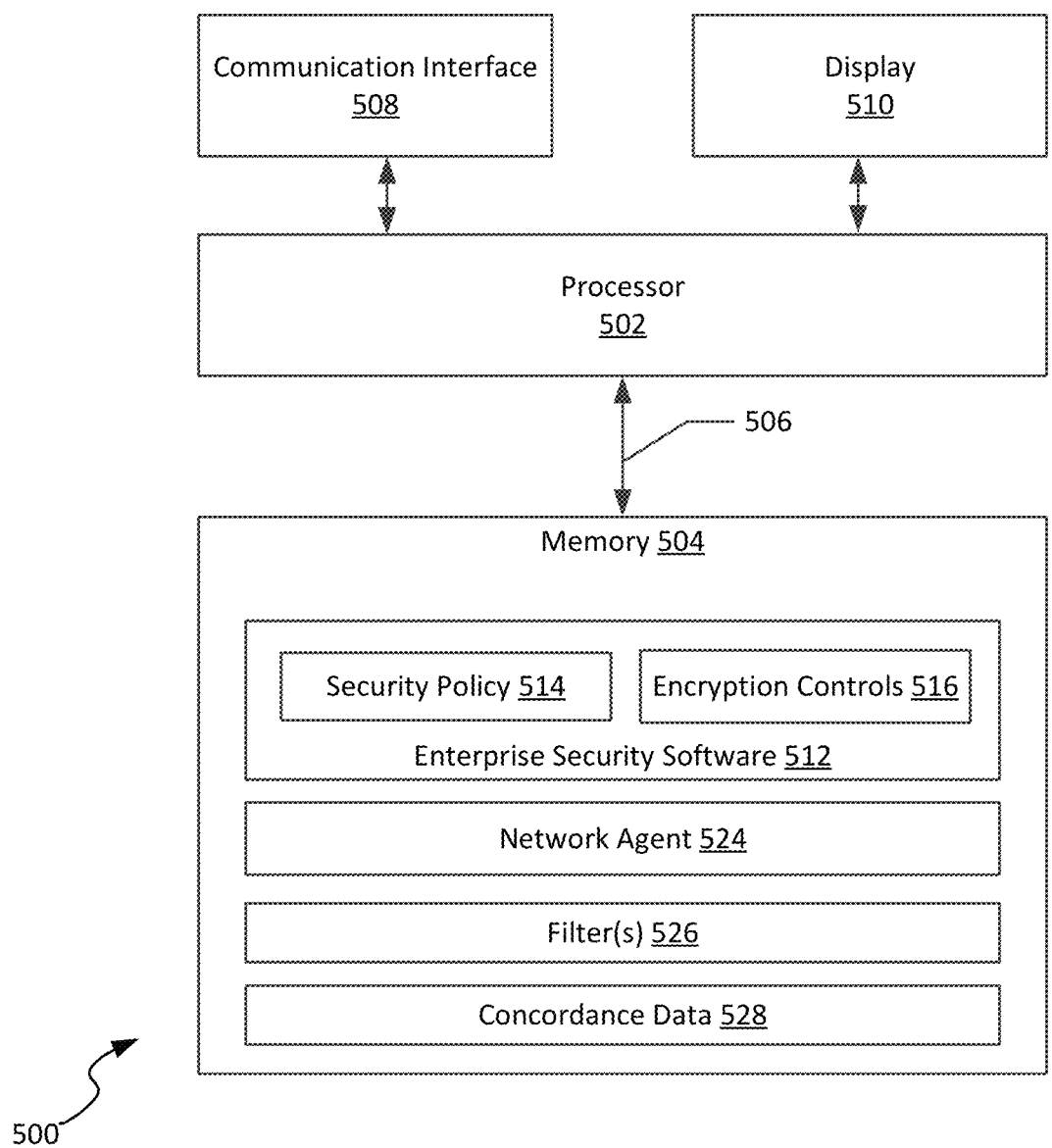
FIG. 5 is a schematic illustration of an example computing system useable within the enterprise network for which a security configuration can be deployed.
Figure 6:
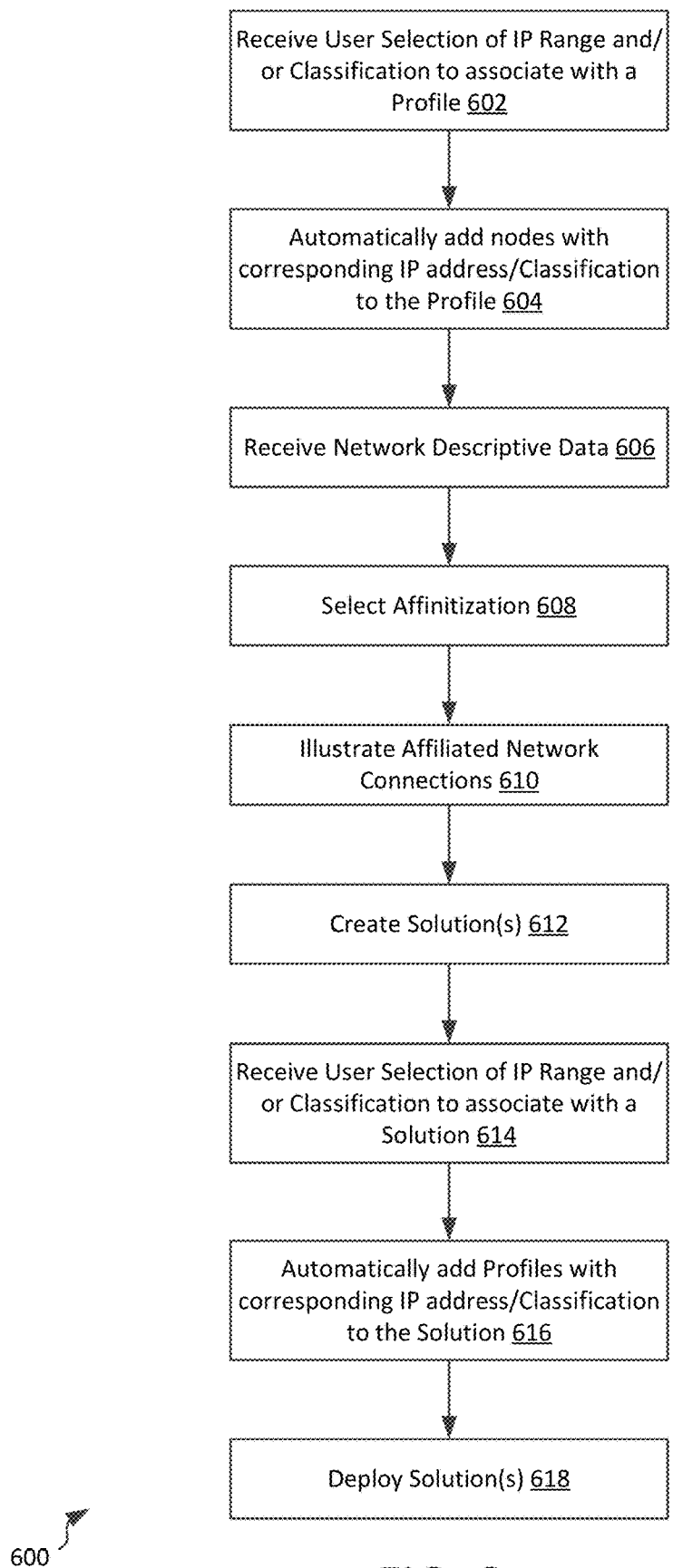
FIG. 6 is a flowchart of a method for configuring security management settings within an enterprise network, according to an example embodiment of the present disclosure.

FIG. 5 is a schematic illustration of an example computing system 500 useable within the enterprise network for which a security configuration can be deployed. In general, the computing system 500 includes a processor 502 communicatively connected to a memory 504 via a data bus 506. The processor 502 can be any of a variety of types of programmable circuits capable of executing computer-readable instructions to perform various tasks, such as mathematical and communication tasks, such as those described above in connection with FIG. 3. The memory 504 can include any of a variety of memory devices, such as using various types of computer-readable or computer storage media, as also discussed above. In the embodiment shown, the memory 504 stores enterprise security software 512 and a network agent 524. The computing system 500 can also include a communication interface 508 configured to receive and transmit data, for example to interact with other nodes within or external to an enterprise network. Additionally, a display 510 can be included for user interaction.

The enterprise security software 512 is configured to control security in storage of data at and communication of data at the computing system 500, and between that system and remote systems. The enterprise security software includes a security policy 514 and encryption controls 516. The security policy 514 and encryption controls 516 can include settings as defined by an enterprise security management policy set at a management server, such as management server 120, which are received as filters 526. Details regarding deployment and use of such enterprise security software are provided in U.S. patent application Ser. No. 14/688,348, entitled "Enterprise Management for Secure Network Communications over IPSec", the disclosure of which was previously incorporated by reference, as well as U.S. patent application Ser. No. 14/753,120, entitled "Secured Networks and Endpoints Applying Internet Protocol Security", and U.S. patent application Ser. No. 14/753,146, entitled "Secure Network Communications in a Mobile Device over IPsec", each assigned to Unisys Corporation of Blue Bell, Pa., the disclosures of each of which are hereby incorporated by reference in their entireties.

The network agent 524 is, in the embodiment shown, a network traffic monitor installed at the computing system 500 and configured to collect concordance data 528. In an example implementation, the concordance data 528 can correspond to network traffic data seen at the computing system 500, and can be uploaded to an enterprise security management configuration server for use as concordance data to determine, along with concordance data from other computing systems (nodes) within the enterprise network, affinities and communication channels among those nodes. In example embodiments, the network traffic can be captured in the form of a PCAP file, a CAP file, or any other format of file containing network traffic at the computing system 500. In example embodiments, network traffic can be imported in a proprietary format (e.g., an ACAP file) rather than standard PCAP or CAP file formats.

II. Scope Definition Within an Enterprise Security Management Configuration Tool Now referring specifically to FIGS. 6-13, details regarding use of an enterprise security management configuration server to configure an enterprise network are provided. In particular, methods of operation of such a server are described which provide additional flexibility in configuring security settings within an enterprise security management tool are provided, as well as an example set of screens generated as part of a configuration user interface, illustrating operation of the enterprise security management tool.

FIG. 6 is a flowchart of a method 600 for configuring security management settings within an enterprise network, according to an example embodiment of the present disclosure. The method 600 can be performed, for example, at an enterprise security management configuration server, such as server 130 of FIG. 1.

In the example shown, the method 600 includes receiving a user selection of a range of IP addresses and/or a classification to associate with a profile (step 602), and automatically adding nodes with corresponding IP addresses and/or classification to the profile (step 604). In some embodiments, receipt of a user selection of a range of IP addresses and/or a classification to associate with a profile may be implemented through a configuration user interface tool such as object details panel 706, as discussed below in connection with FIG. 7. At step 606, network concordance data is optionally imported into the tool, for example, if network concordance data was not previously imported or if new network concordance data is desired. The network concordance data can be received from nodes within an enterprise network, such as the computing system 500 described above in connection with FIG. 5. The network concordance data can be aggregated, for example by the enterprise security management configuration server or a management server, such as management server 120 of FIG. 1.

In some examples, the concordance data can define the nodes and interconnections among the nodes that are included within the enterprise network. Optionally, a configuration user interface can display each of the nodes, and channels among the nodes, in such a configuration user interface, based on the flows and friendships defined in the concordance data. The selection of which nodes within an enterprise network from which to gather concordance data is a matter of choice, but to ensure a complete security solution, it is preferred to capture concordance data from an adequate number of nodes as will provide an accurate model of the enterprise network. For example, such concordance data could be gathered from each node intended to be secured.

In the example shown, the method 600 may include receiving a selection of an affinitization level to be used in grouping nodes into profiles (step 608). This can include presenting an affinitization tool to a user in a configuration user interface as part of a tool palette included therein, and receiving a selection of a specific setting for affinitization that defines a threshold similarity between concordance data of nodes before those nodes will be grouped into profiles. Upon selection of the affinitization level, the method 600 can include processing affinitization based on the concordance data, and updating a user interface to illustrate affiliated network connections in the profiles (step 610) while maintaining the nodes added to profiles based on IP addresses and/or classification at step 604 within those respective profiles.

Details regarding affinitization are provided in U.S. patent application Ser. No. 15/494,869, entitled "Multi-Level Affinitization for Enterprise Security Management, assigned to Unisys Corporation of Blue Bell, Pa., the disclosure of which was previously incorporated by reference.

In the example shown, the method 600 also may include creating one or more solutions by grouping two or more profiles that are connected by a channel (step 612). As noted above, a solution generally corresponds to a logical grouping of one or more profiles, typically two or more profiles that are interconnected by a channel and which are likely to have common security settings based on the manner in which the profiles interact. For example, a database server, an application server communicatively connected to the database server, one or more web servers hosting web-based user interfaces for the application, and one or more load balancers distributing traffic within the group of application servers included within the profile of application servers, or other types of network devices likely to be required to share security policy settings due to shared data/network traffic. In example embodiments, creating one or more solutions can be performed automatically based on a methodology for automatically identifying a root profile (a likely starting point or source of data that may be delivered by way of a solution) and subsequently identifying one or more chained profiles, other than endpoints, that are logically connected. In alternative embodiments, creating solutions can be performed manually by manually identifying a root profile to be included in a solution, and dragging and dropping one or more other profiles interconnected to the root profile by a channel connected to the root profile into association with the solution within the configuration user interface.

In the example shown, the method 600 also may include receiving a user selection of a range of IP addresses and/or a classification to associate with a solution (step 614), automatically adding profiles with corresponding IP addresses and/or classification to the solution (step 616).

In the example shown, the method 600 may include deploying one or more solutions to an enterprise management server (step 618). In example embodiments, deploying solutions includes deploying an entire project to an enterprise management server, such as management server 120. This can include generating a policy file that can be ingested by the management server 120, for storage of security settings in the configuration database 122. In other embodiments, deploying solutions includes receiving a selection of one or more solutions and generating a policy file directed only to portions of an enterprise network. Such a partial project deployment can be transmitted as one or more policy files distributed to one or more different management servers 120. The policy file, or security settings file, can be configured to describe security settings for operation and interactivity of each of the one or more nodes included in the identified one or more solutions, and is distributed to the configuration database 122 of associated management servers for distribution to such nodes.

Figure 7:
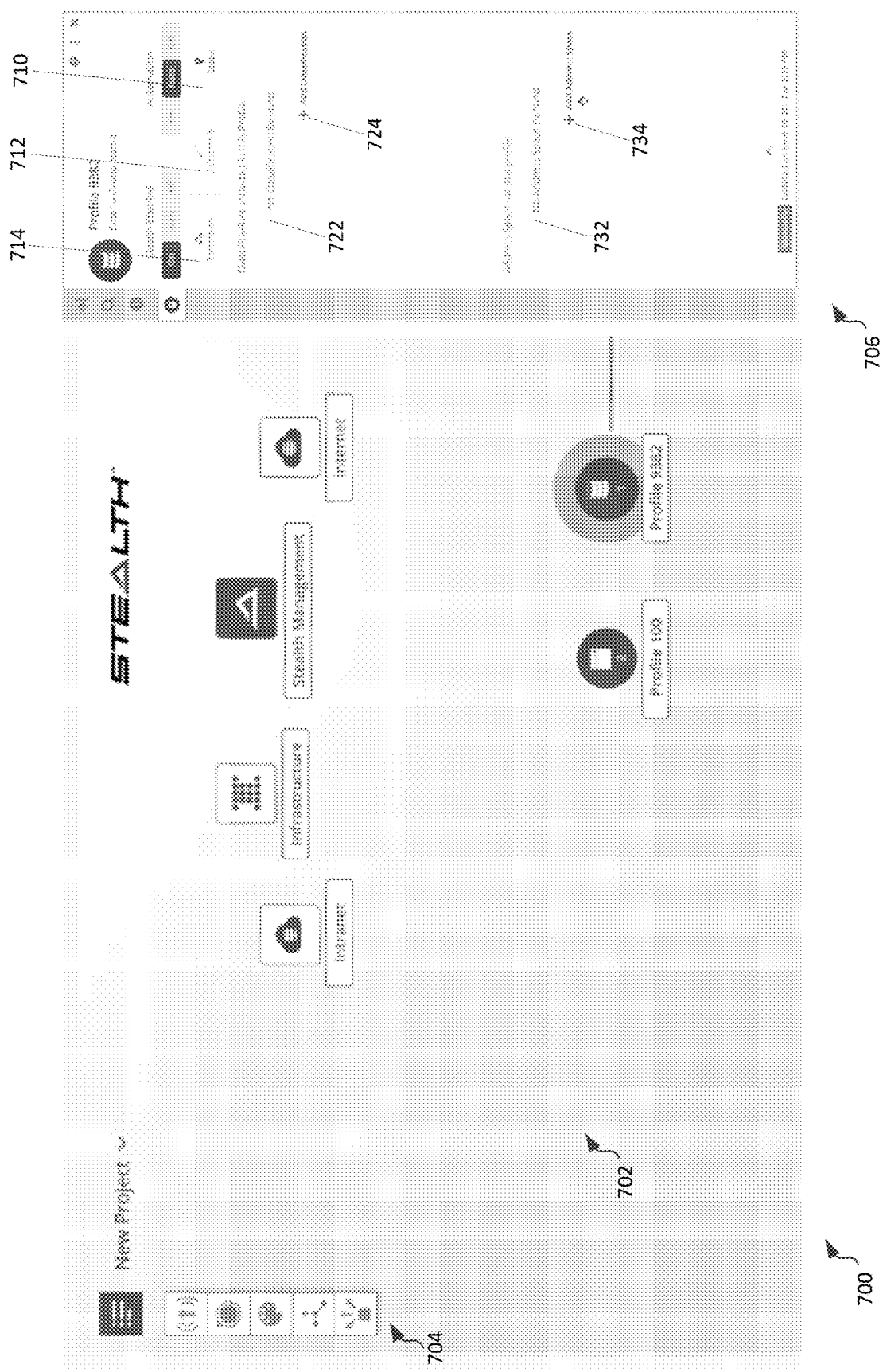
FIG. 7 is a configuration user interface of an enterprise security management configuration tool useable to define address space and classification scope of an object in an enterprise security project, according to an example embodiment.

FIG. 7 is a graphical user interface 700 of an enterprise security management configuration tool useable to define address space and classification scope of an object (e.g. a profile or solution) in an enterprise security project, according to an example embodiment of the present disclosure. As noted above, a project corresponds to a container in which a security configuration can be developed for export to a management server 120. In general, the configuration user interface 700 includes an enterprise topology region 702 in which an enterprise topology can be viewed and graphically manipulated, and a tool palette 704. In the example implementation shown, the enterprise topology region 702 includes two icons representing two profiles, in addition to the four predefined solutions (e.g. Intranet, Infrastructure, Stealth Management, and Internet) included in the project. An object (e.g. one of the profiles) in topology region 702 may be selected and an object details panel 706 may be displayed, illustrating security details for that object. In the example shown, Profile 9382 is selected, and a number of attributes are displayed. A Scope tab 710 within the object details panel 706 displays two sections corresponding to the classification and address space scope of the selected object. In the example shown, the upper section includes a Classification text indicator 722 and an Add Classification button 724. The lower section includes an Address Space text field 732 and an Add Address Space button 734. Object details panel 706 also displays a Channels tab 712 that shows the number of channels associated with member nodes and that is user-selectable to display more details regarding the channels associated with the object, and also a Members tab 714 that shows the number of members included in the object and that is also user-selectable to display more details regarding the members included in the object (e.g. Profile 9382 in the example shown).

Figure 8B:
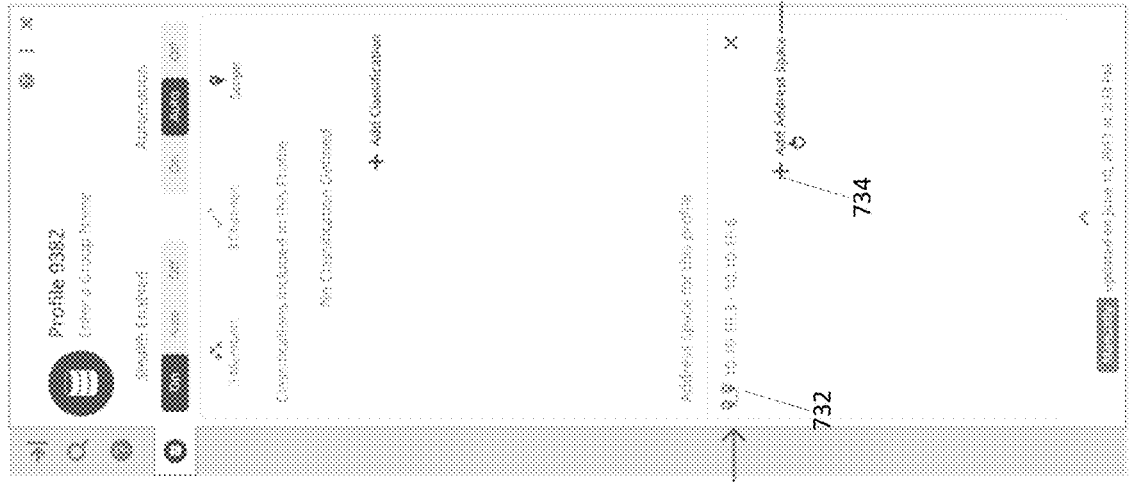
FIG. 8B illustrates another example of using an objects details panel of a profile object within a configuration user interface to define the address space scope of a profile within a project, according to an example embodiment of the present disclosure.
Figure 8A:
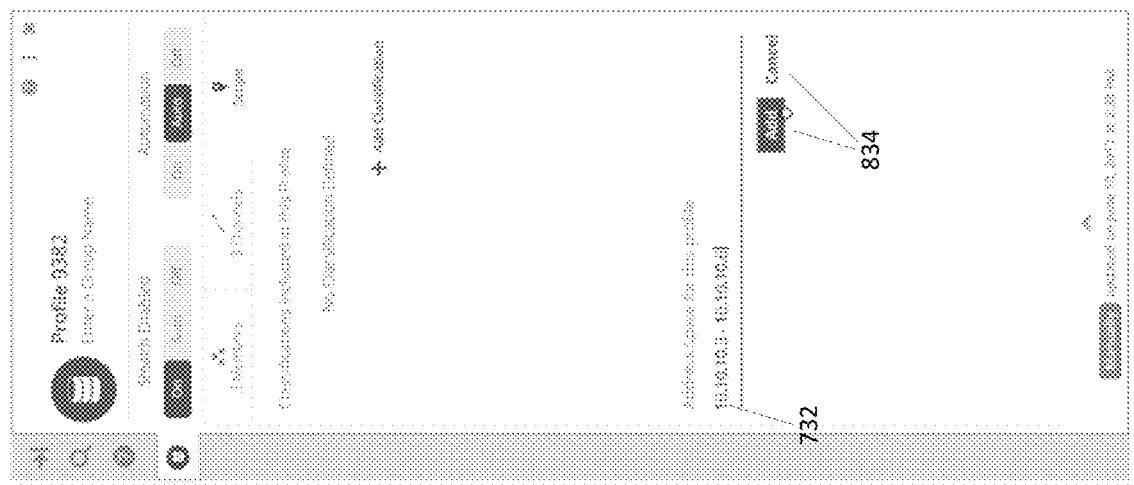
FIG. 8A illustrates one example of using an objects details panel of a profile object within a configuration user interface to define the address space scope of a profile within a project, according to an example embodiment of the present disclosure.

FIGS. 8A and 8B illustrate an example of using an objects details panel of a profile object within a configuration user interface to define the address space scope of a profile within a project, according to an example embodiment of the present disclosure. In the example shown in FIG. 8A, the Add Address Space button 734 is selected, and the Add Address Space text field 732 is activated to allow a user to input an address range. Additionally, the Add Address button 734 is replaced by Add button 834 and the Cancel button 836 to receive user input finalizing or canceling the address space typed into the Add Address Space text field 732. The user then types in an IP address, a list of IP addresses, or an IP address range. In the example shown, a range of IP addresses are typed into the Address space text field 732. If the user then selects the Cancel button 836, the IP address range is not added or associated with the profile, the Address Space text field 732 is deactivated such that the field displays the current IP addresses added or associated with the profile, if any, and does not accept text input until the next selection of the Add Address Space button 734, and the Add button 834 and the Cancel button 836 are replaced with the Add Address Space button 734. If the user instead selects the Add button 834, the address scope that was typed into the Add Address Space text field 732 (e.g. an IP address, a list of IP addresses, or an IP address range) is added to, or associated with, the profile. If nodes exist in the project that have an address that matches the added address scope (e.g. the IP address, the list of IP addresses, or range of IP addresses), the enterprise security management tool will update the layout automatically to include those nodes as members of the profile associated with that IP address space. When an address space scope is added to a profile, the change may affect the entire project. The user may re-run affinitization, which would change which nodes are included in which profiles.

In some embodiments, the entire IP address range available at the profile level is unique to the entire project. For example, for 32-bit IPv4 addressing, the IP address range available for association with profiles within a project are 0.0.0.1 to 255.255.255.254. A separate project would have the same IP addresses available for association with the profiles of that separate project independent of any other project. Although IPv4 addressing is shown in the examples, a person of skill in the art will recognize that any type of addressing is within the scope of this disclosure.

In some embodiments, a particular address scope may by associated with a single profile. For example, if an IP address or address range is already associated with a first profile and a user attempts to associate an IP address or addresses within that profile's scope with a different, second profile, those addresses will be removed from the first profile and associated with the second profile. Nodes having such IP addresses will be removed as members of the first profile and included as members of the second profile. In some embodiments, the user is either warned of, or is asked to confirm, that such a change of address scope will result in changes of membership for one or more nodes, for example, with a dialog box (not shown) describing the change and requiring user input to confirm or cancel the changes.

In addition, in some embodiments, an address scope may be removed from a profile, or disassociated from that profile, without adding, or associating, that address scope with another profile. When IP addresses are removed from a profile's scope without being associated with another profile, the change may affect the entire project. The user may re-run affinitization, which would change which nodes are included in which profiles. Additionally, if there is a member node or nodes associated with the address or addresses removed from the first profile, a partial non-destructive affinitization may be chosen by the user to ensure that such node or nodes are included in the appropriate profile or profiles. Such nodes become members of the profiles best matching the affinity score of each node. If a node having an IP address that was removed from the scope of a profile doesn't match the affinity score or threshold of any existing profiles in the project, a singleton profile is created with that node as a member.

In some embodiments, a user may manually remove a node that is included within a profile and that has an IP address associated with the profile that is within the IP addresses or IP address range that are defined in that profile's address scope. When such a node is removed from the profile, the IP addresses or IP address range associated with the profile is automatically updated to remove the IP address of the removed node. In some embodiments, the user is notified of the change.

In some embodiments, user input in Address Space field 732 may be validated as a valid IP address scope entry. The format of the entry may be any format supported by the addressing used. For example, for IPv4 addressing, the format of the user input may be four numbers separated by periods, the numbers being a maximum of three digits each, e.g. 192.168.1.12. As another example, the input may be in CIDR notation, such as 192.168.1.0/24 corresponding to address range 192.168.1.1 to 192.168.1.254. The entered range and notation may be validated such that invalid entries are not accepted, for example, a CIDR notation entry of 192.168.50/24 would be invalid because the range would be 192.168.1.50 to 192.168.1.295 because the last number exceeds the maximum valid IPv4 value of 255. A person of skill in the art will recognize that any type of addressing format is within the scope of this disclosure, and validation may be implemented that is particular to the format used.

Figure 9:
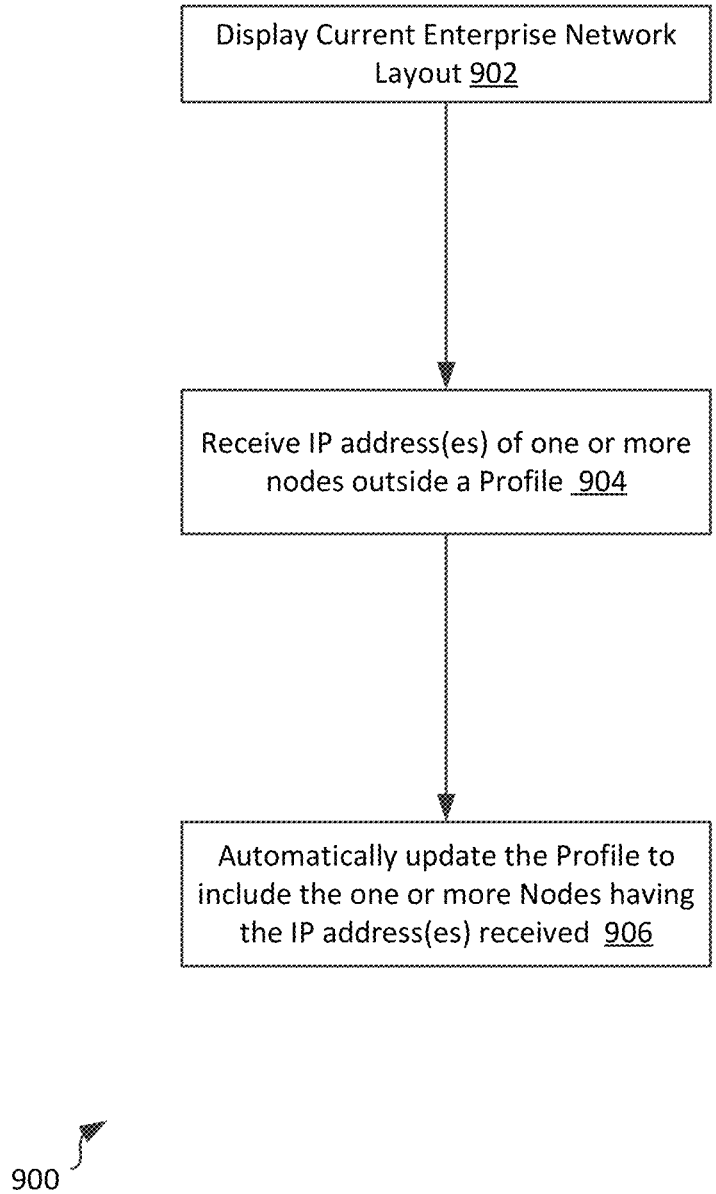
FIG. 9 is a flowchart of a method for adding an address space scope to a profile object within a configuration user interface, according to an example embodiment of the present disclosure.

FIG. 9 is a flowchart of a method 900 for adding an address space scope to a profile object within a configuration user interface, according to an example embodiment of the present disclosure. The method 900 can be performed, for example, at an enterprise security management configuration server, such as server 130 of FIG. 1.

In the example shown, the method 900 includes displaying a current enterprise network layout in an enterprise security management configuration tool (step 902), receiving one or more IP addresses into the tool (step 904), and automatically updating the profile to include the one or more nodes having the IP address or addresses received (step 906). When the address scope of a profile is changed, such as by method 900, the change may affect the entire project. For example, the user may re-run affinitization (step 606 of method 600) which would change which nodes are included in which profiles.

Figures 10A, 10B:
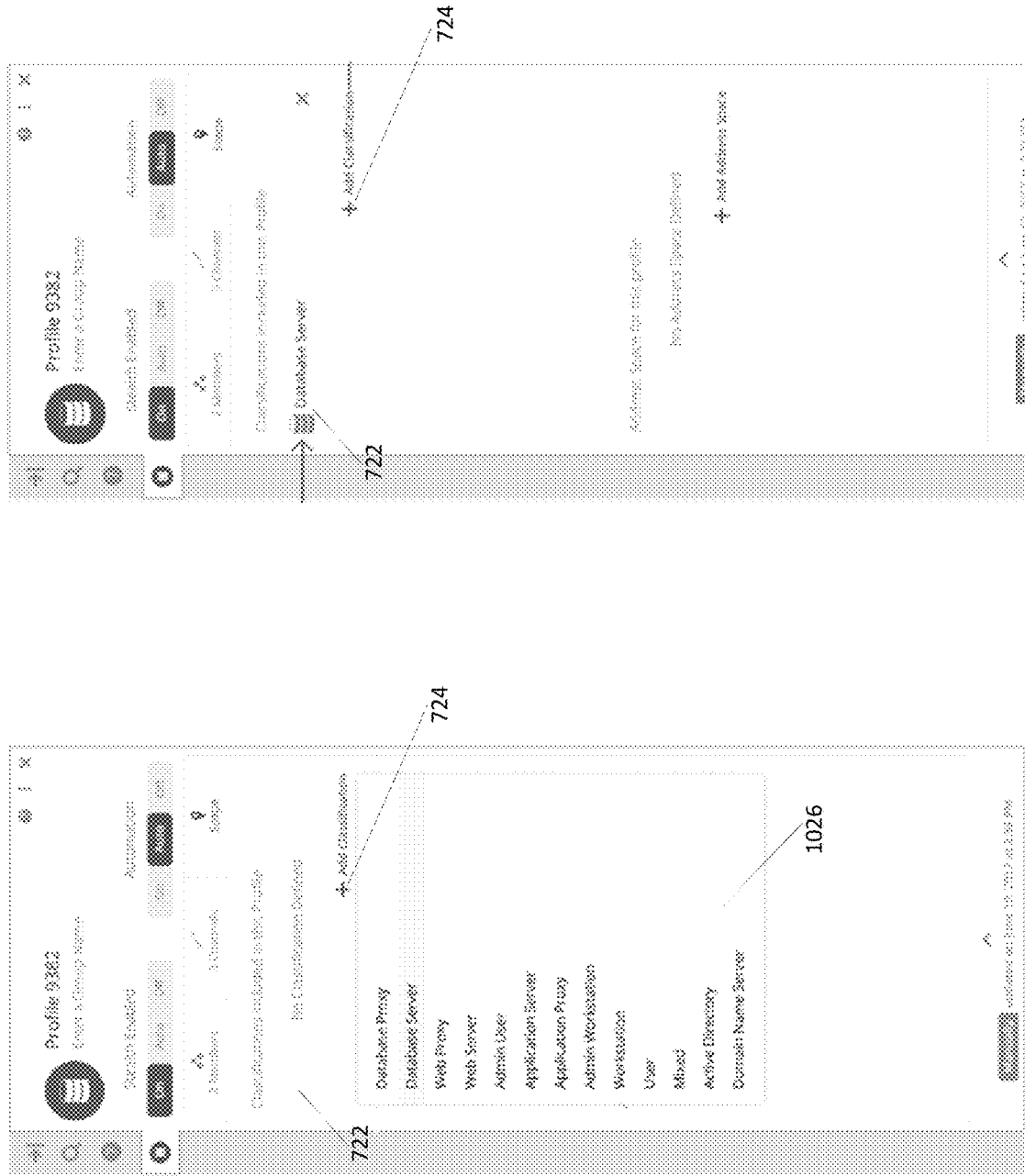
FIG. 10A illustrates one example of using an objects details panel of a profile object within a configuration user interface to define the classification scope of a profile within a project, according to an example embodiment of the present disclosure.
FIG. 10B illustrates another example of using an objects details panel of a profile object within a configuration user interface to define the classification scope of a profile within a project, according to an example embodiment of the present disclosure.

FIGS. 10A and 10B illustrate one example of using an objects details panel of a profile object within a configuration user interface to define the classification scope of a profile within a project, according to an example embodiment of the present disclosure. In the example shown in FIG. 10A, the Add Classification button 724 is selected and a drop down menu 1026 is displayed. Drop down menu 1026 includes a list predetermined classifications for the enterprise security management configuration tool, the list of classifications may include, but is not limited to: a dataset proxy, a web proxy, a web server, an admin user, an application server, an application proxy, an admin workstation, a workstation, a user, a mixed, an active directory, and a domain name server classification. Other classifications could be used as well, and in fact custom classifications could be defined. Further details regarding forming custom classifications are provided in U.S. patent application Ser. No. 15/972,524, entitled "Custom Node and Profile Classifications for Enterprise Security Management Tool", the disclosure of which is hereby incorporated by reference in its entirety.

The user then selects one of the classifications in drop down menu 1026, and the selected classification is added to, or associated with, the classification scope of the profile. In the example shown in FIG. 10B, a database server has been selected and the Classification text indicator 722 displays the icon for a database server and the text "Database Server" indicating the selected classification scope. If nodes exist in the project that match the added classification scope, the enterprise security management tool will update the layout automatically to include those nodes as members of the profile. When a classification scope is added to a profile, the change may affect the entire project. The user may re-run affinitization which would change which nodes are included in which profiles.

In some embodiments, there is a unique set of all possible classifications that exist within a project. A particular classification scope may be associated with a single profile, and no two profiles within the same project may have the same classification. For example, if a classification is already associated with a first profile and a user attempts to associate the same classification with a different, second profile, that classification will be associated with the second profile and removed from the first profile.

In addition, a classification scope may be removed from a profile, or disassociated from that profile, without adding, or associating, that classification scope with another profile. When a classification scope is removed from a profile without being associated with another profile, the change may affect the entire project. The user may re-run affinitization which would change which nodes are included in which profiles. Additionally, if there is a member node or nodes associated with the classification removed from the first profile, such member nodes remain as members of the profile because there was a previous determination to associate such node or nodes with the profile, either by affinitization or by user selection. Furthermore, in some embodiments, there are certain classifications which are locked and may not be removed from a profile. Such classifications may include, but are not limited to: a Stealth management server, a Stealth standalone authorization server, or a Stealth service mode profiles classification.

In some embodiments, a user may manually remove a node that is included within a profile and that has a classification that is within the classification scope associated with the profile. When such a node is removed from the profile, the classification of the node may be changed, e.g., to be considered "unclassified". In some embodiments, the user is notified of the change.

Figure 11:
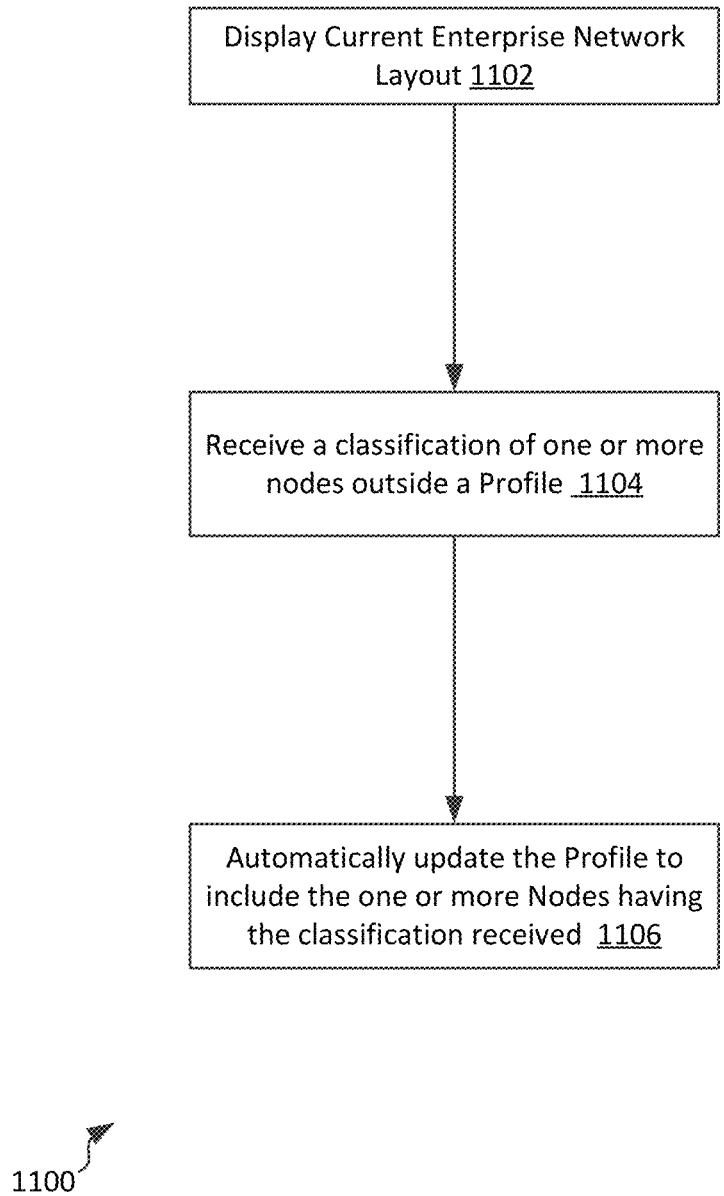
FIG. 11 is a flowchart of a method for adding a classification scope to a profile object within a configuration user interface, according to an example embodiment of the present disclosure.

FIG. 11 is a flowchart of a method 1100 for adding a classification scope to a profile object within a configuration user interface, according to an example embodiment of the present disclosure. The method 1100 can be performed, for example, at an enterprise security management configuration server, such as server 130 of FIG. 1.

In the example shown, the method 1100 includes displaying a current enterprise network layout in an enterprise security management configuration tool (step 1102), receiving a classification into the tool (step 1104), and automatically updating the profile to include the classification received (step 1106). When the classification scope of a profile is changed, such as by method 1100, the change may affect the entire project. For example, the user may re-run affinitization (step 606 of method 600) which would change which nodes are included in which profiles.

Figure 12:
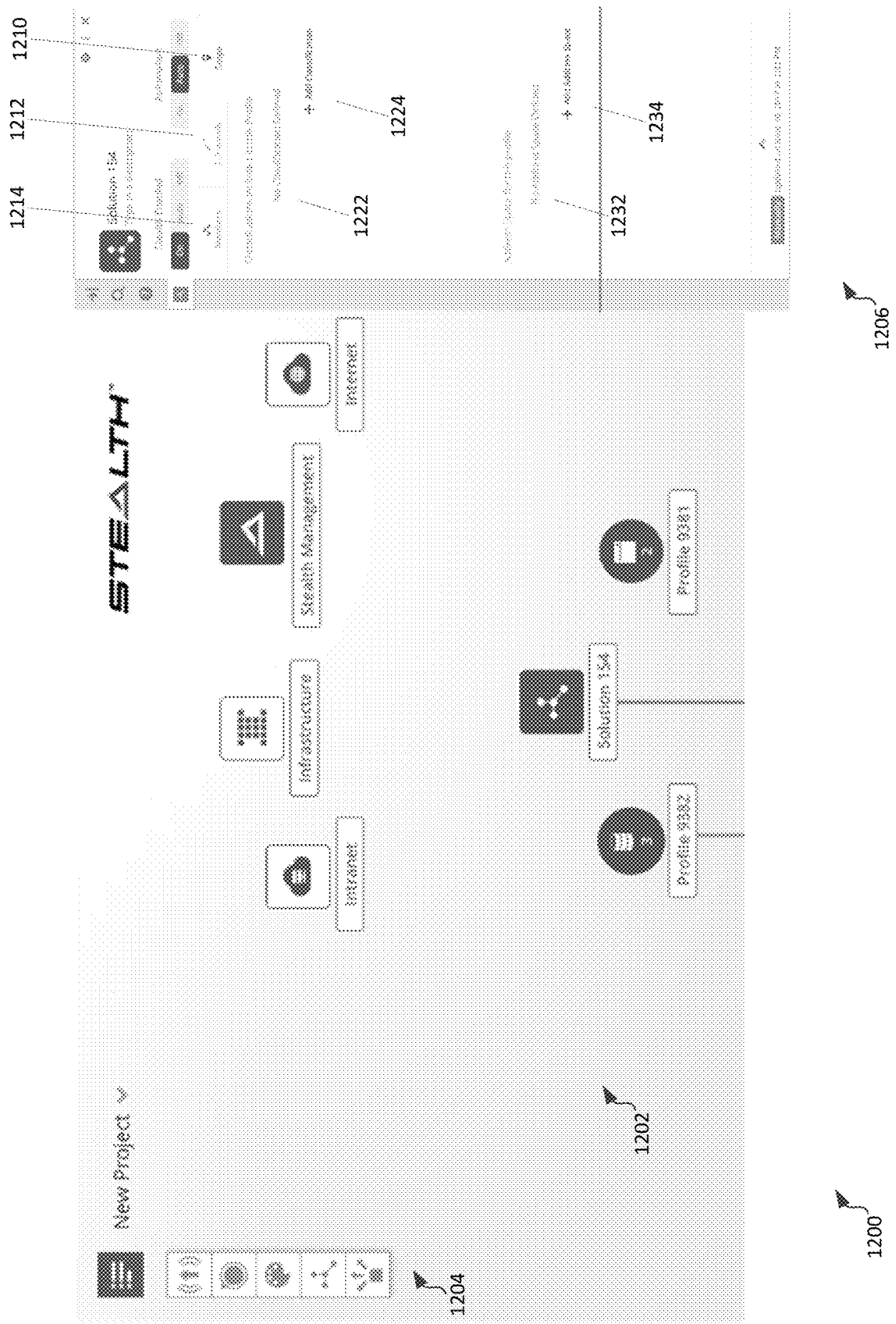
FIG. 12 is a configuration user interface of an enterprise security management configuration tool useable to define address space and classification scope of a solution in an enterprise security project, according to an example embodiment.

FIG. 12 is a configuration user interface 1200 of an enterprise security management configuration tool useable to define address space and classification scope of a solution in an enterprise security project, according to an example embodiment of the present disclosure. In general, the configuration user interface 1200 includes an enterprise topology region 1202 in which an enterprise topology can be viewed and graphically manipulated, and a tool palette 1204. In the example implementation shown, the enterprise topology region 1202 includes three icons representing two profiles and one solution, in addition to the four predefined solutions (e.g. Intranet, Infrastructure, Stealth Management, and Internet) included in the project. An object (e.g. a profile or solution) in topology region 1202 may be selected and an object details panel 1206 may be displayed, illustrating security details for that object. In the example shown, Solution 154 is selected, and a number of attributes are displayed. A Scope tab 1210 within the object details panel 1206 displays two sections corresponding to the classification and address space scope of the selected object. In the example shown, the upper section includes a Classification text indicator 1222 and an Add Classification button 1224. The lower section includes an Address Space text field 1232 and an Add Address Space button 1234. Object details panel 1206 also displays a Channels tab 1212 that shows the number of channels associated with member nodes and that is user-selectable to display more details regarding the channels associated with the object, and also a Members tab 1214 that shows the number of members included in the object and that is also user-selectable to display more details regarding the members included in the object (e.g. Solution 154 in the example shown).

According to some embodiments, the address space scope and classification scope of a solution, such as Solution 154, may be defined in the same manner as address space scope and classification scope definition of profiles as shown in FIGS. 8-11. Similar to profiles, the entire IP address range and set of all possible classifications available at the solution level is unique to the entire project; however, for solutions there are predefined addresses or address ranges for Intranet and Internet solutions. In some examples, the predefined ranges for the Intranet and Internet solutions are applied when a project is created. The IP address space and classifications existing in the project on the profile level and solution level are independent, for example, such that the same IP addresses and/or classification may be independently associated with both a solution and a profile within the same project. In addition, a separate project would have the same IP addresses and/or classifications available for association with the solutions of that separate project independent of the solutions within any other project.

In some embodiments, a particular address space scope may by associated with a single solution. For example, if an IP address or address range is already associated with a first solution and a user attempts to associate an IP address or addresses within that solution's scope with a different, second solution within the same project, those addresses will be removed from the first solution and associated with the second solution. Nodes having such IP addresses will be removed as members of the first solution and included as members of the second solution. When IP addresses are added to a solution's address space scope, the change may affect the entire project. The user may re-run affinitization which would change which nodes are included in which solutions.

In addition, an address space scope may be removed from a solution, or disassociated from that solution, without adding, or associating, that address scope with another solution. When IP addresses are removed from a solution's scope without being associated with another solution, the change may affect the entire project. The user may re-run affinitization which would change which nodes are included in which solutions. Additionally, if there is a member node or nodes associated with the address or addresses removed from the first solution, a partial non-destructive affinitization may be chosen by the user to ensure that such node or nodes are included in the appropriate solution or solutions. Such nodes become members of the solutions best matching the affinity score of each node. If a node having an IP address that was removed from the scope of a solution doesn't match the affinity score or threshold of any existing solutions in the project, a singleton profile is created with that node as a member.

In some embodiments, there is a unique set of all possible classifications that exist within a project. A particular classification scope may be associated with a single solution, and no two solutions within the same project may have the same classification. For example, if a classification is already associated with a first solution and a user attempts to associate the same classification with a different, second solution, that classification will be associated with the second solution and removed from the first solution.

In addition, a classification scope may be removed from a solution, or disassociated from that solution, without adding, or associating, that classification scope with another solution. When a classification scope is removed from a solution without being associated with another solution, the change may affect the entire project. The user may re-run affinitization which would change which nodes are included in which solutions. Additionally, if there is a member node or nodes associated with the classification removed from the first solution, such member nodes remain as members of the solution because there was a previous determination to associate such node or nodes with the solution, either by affinitization or by user selection. Furthermore, in some embodiments, there are certain classifications which are locked and may not be removed from a solution. Such classifications may include, but are not limited to: a Stealth management solution, Stealth management server, a Stealth standalone authorization server, or a Stealth service mode profiles classification.

Figure 13:
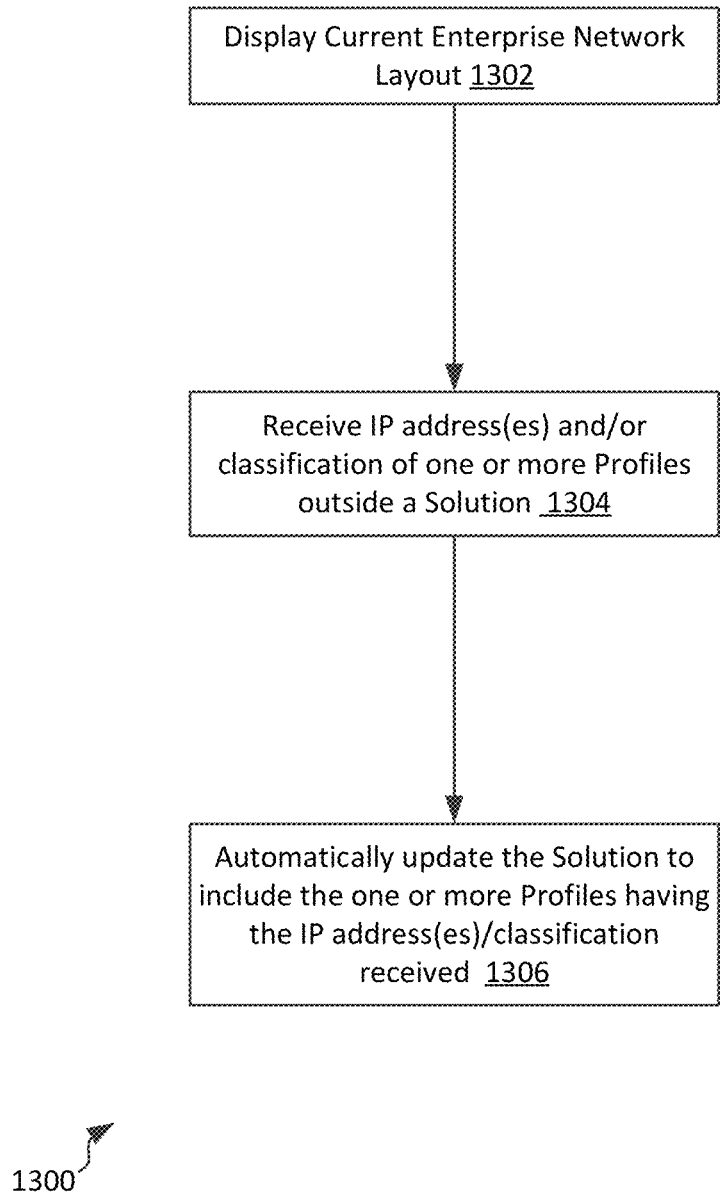
FIG. 13 is a flowchart of a method for adding an address space scope and/or classification scope to a solution, according to an example embodiment of the present disclosure.

FIG. 13 is a flowchart of a method 1300 for adding an address space scope and/or a classification scope to a solution, according to an example embodiment of the present disclosure. The method 1300 can be performed, for example, at an enterprise security management configuration server, such as server 130 of FIG. 1.

In the example shown, the method 1300 includes displaying a current enterprise network layout in an enterprise security management configuration tool (step 1302), receiving IP addresses and/or a classification into the tool (step 1304), and automatically updating the solution to include the IP addresses and/or classification received (step 1306). When the classification scope of a solution is changed, such as by method 1300, the change may affect the entire project. For example, the user may re-run affinitization (step 606 of method 600) which would change which nodes are included in which profiles.

Referring now to IP address scope and classification scope for profiles and solutions within an enterprise security management configuration tool, in some embodiments, the scope functionality applies to automation, such as by the affinitization process, and the user has the ability to override the address space or classification scopes of an object, such as by manually moving nodes between profiles or adding IP addresses to nodes or profiles. The priority order for automated grouping of nodes into profiles and profile creation is: (1) scope address space, (2) scope classification, and (3) affinitization result (e.g. affinity score). For example, if an IP address is manually added/associated with a profile, the node that has that IP address is added to the profile and removed from affinitization since the profile it is to be included in within the project is already known and was explicitly chosen by the user.

In some embodiments, the enterprise security management configuration tool includes an option to prevent profiles and nodes from moving, for example, when an IP address or IP address range or classification is associated with a profile or solution. In some embodiments, when such a change occurs, a list may be provided to the user indicating what will change (e.g. what nodes and/or profiles will move and to where) in the enterprise security management configuration tool.

In some embodiments, it is possible for nodes to affinitize with a profile or profiles having a defined IP address scope or classification scope, or both, but not having an IP address or classification matching that scope. In such cases, the node or nodes would be placed into their own profile or profiles instead of being merged into that profile for which their IP address or classification scope does not match.

In some embodiments, if a profile does match all of the scope (e.g. both IP address scope and classification scope) defined in a solution, that profile cannot be added as a member of that solution. In addition, in some embodiments, all profiles that match a solution's or solutions' defined IP address and classification scope(s) must be added to that solution or those solutions, and are no longer available to become roots of new solutions. In some embodiments, if the member nodes of a profile to be added to a solution do not all match the IP address space scope defined in the solution, the profile is split, with the matching nodes remaining in the profile and the profile added to the solution, and the remaining non-matching nodes are included in a new profile placed in the enterprise topology region (e.g. such as enterprise topology region 702 or 1202) of the enterprise security management configuration tool.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system of configuring a common security policy for a plurality of nodes comprising:

an enterprise security management configuration server comprising;
 a programmable circuit;
 a memory storing computer-executable instructions that, when executed by the programmable circuit, cause the enterprise security management configuration server to:
 associate one or more IP addresses with at least one profile within an enterprise security management configuration tool;
 for each of the nodes included within the enterprise network:
 determine whether an IP address of the node corresponds to at least one of the one or more IP addresses associated with the at least one profile;
 based on the IP address of the node corresponding to at least one of the one or more IP addresses associated with the profile, add the node to the at least one profile;
 affinitize one or more of the plurality of nodes into one or more profiles based on network concordance data, the one or more profiles including the at least one profile associated with the one or more IP addresses;
 determine a common security policy to apply to each of the nodes within the at least one profile.

2. The system of claim 1, wherein affinitizing one or more of the plurality of nodes into one or more profiles based on network concordance data occurs before associating one or more IP addresses with the at least one profile within an enterprise security management configuration tool.

3. The system of claim 1, wherein the computer-executable instructions, when executed by the programmable circuit, further cause the enterprise security management configuration server to:
 based on a user indication, remove a node from the at least one profile;
 disassociate the IP address of the node from the one or more IP addresses associated with the profile.

4. The system of claim 1, wherein the computer-executable instructions, when executed by the programmable circuit, further cause the enterprise security management configuration server to:
 associate a classification with a profile within the enterprise security management configuration tool;
 for each of the nodes included within the enterprise network:
 determine whether a classification of the node corresponds to the classification associated with the profile;
 based on the classification of the node corresponding to the classification of the profile, add the node to the profile;
 affinitize one or more of the plurality of nodes into one or more profiles based on network concordance data, the one or more profiles including the profile associated with the classification;
 determine a common security policy to apply to each of the nodes within the profile.

5. The system of claim 4, wherein the computer-executable instructions, when executed by the programmable circuit, further cause the enterprise security management configuration server to:
 based on a user indication, remove a node from the at least one profile;
 change the classification of the node to unassigned.

6. The system of claim 1, wherein the computer-executable instructions, when executed by the programmable circuit, further cause the enterprise security management configuration server to:
 associate one or more IP addresses with at least one solution within the enterprise security management configuration tool;
 for each of the profiles included within the enterprise network:
 determine whether at least one of the one or more IP addresses associated with the profile corresponds to at least one of the one or more IP addresses associated with the at least one solution;
 based on the at least one of the one or more IP addresses associated with the profile corresponding to at least one of the one or more IP addresses associated with the solution, add the profile to the at least one solution;
 affinitize one or more of the plurality of profiles into one or more solutions based on network concordance data, the one or more solutions including the at least one solution associated with the one or more IP addresses;
 determine a common security policy to apply to each of the nodes within the at least one solution.

7. The system of claim 1, wherein the computer-executable instructions, when executed by the programmable circuit, further cause the enterprise security management configuration server to:
 associate a classification with a solution within the enterprise security management configuration tool;
 for each of the profiles included within the enterprise network:
 determine whether a classification of the profile corresponds to the classification associated with the solution;
 based on the classification of the profile corresponding to the classification associated with the solution, add the profile to the solution;
 affinitize one or more of the plurality of profiles into one or more solutions based on network concordance data, the one or more solutions including the solution associated with the classification;
 determine a common security policy to apply to each of the nodes within the solution.

8. The system of claim 1, further comprising a user interface of the enterprise security management configuration tool that displays the one or more profiles.

9. The system of claim 1, wherein determining a common security policy to apply each of the nodes within the profile is based on a security setting received at the user interface for the profile.

10. A system of configuring a common security policy for a plurality of nodes comprising:
 an enterprise security management configuration server comprising;
 a programmable circuit;
 a memory storing computer-executable instructions that, when executed by the programmable circuit, cause the enterprise security management configuration server to;
 associate a classification with a profile within an enterprise security management configuration tool;
 for each of the nodes included within the enterprise network:
 determine whether a classification of the node corresponds to the classification associated with the profile;

based on the classification of the node corresponding to the classification associated with the profile, add the node to the profile;

affinitize one or more of the plurality of nodes into one or more profiles based on network concordance data, the one or more profiles including the profile associated with the classification;

determine a common security policy to apply to each of the nodes within the profile.

11. The system of claim 10, wherein affinitizing one or more of the plurality of nodes into one or more profiles based on network concordance data occurs before associating the classification with the profile within an enterprise security management configuration tool.

12. The system of claim 10, wherein the computer-executable instructions, when executed by the programmable circuit, further cause the enterprise security management configuration server to:

associate one or more IP addresses with at least one solution within the enterprise security management configuration tool;

for each of the profiles included within the enterprise network:

determine whether at least one of the one or more IP addresses associated with the profile corresponds to at least one of the one or more IP addresses associated with the at least one solution;

based on the at least one of the one or more IP addresses associated with the profile corresponding to at least one of the one or more IP addresses associated with the solution, add the profile to the at least one solution;

affinitize one or more of the plurality of profiles into one or more solutions based on network concordance data, the one or more solutions including the at least one solution associated with the one or more IP addresses associated with the at least one solution;

determine a common security policy to apply to each of the nodes within the at least one solution.

13. The system of claim 10, wherein the computer-executable instructions, when executed by the programmable circuit, further cause the enterprise security management configuration server to:

associate a classification with a solution within the enterprise security management configuration tool;

for each of the profiles included within the enterprise network:

determine whether a classification of the profile corresponds to the classification associated with the solution;

based on the classification of the profile corresponding to the classification associated with the solution, add the profile to the solution;

affinitize one or more of the plurality of profiles into one or more solutions based on network concordance data, the one or more solutions including the solution associated with the classification;

determine a common security policy to apply to each of the nodes within the solution.

14. A method of configuring a common security policy for a plurality of nodes included within an enterprise network, the method comprising:

associating one or more IP addresses with at least one profile within an enterprise security management configuration tool;

for each of the nodes included within the enterprise network:

determining whether an IP address of the node corresponds to at least one of the one or more IP addresses associated with the at least one profile;

based on the IP address corresponding to at least one of the one or more IP addresses, adding the node to the at least one profile;

affinitizing one or more of the plurality of nodes into one or more profiles based on network concordance data, the one or more profiles including the at least one profile associated with the one or more IP addresses;

determining a common security policy to apply to each of the nodes within the at least one profile.

15. The method of claim 14, wherein affinitizing one or more of the plurality of nodes into one or more profiles based on network concordance data occurs before associating one or more IP addresses with at least one profile within an enterprise security management configuration tool.

16. The method of claim 14, further comprising:

based on a user indication, removing a node from the at least one profile;

disassociating the IP address of the node from the one or more IP addresses associated with the at least one profile.

17. The method of claim 14, further comprising:

associating a classification with a profile within the enterprise security management configuration tool;

for each of the nodes included within the enterprise network:

determining whether a classification of the node corresponds to the classification associated with the profile;

based on the classification of the node corresponding to the classification of the profile, adding the node to the profile;

affinitizing one or more of the plurality of nodes into one or more profiles based on network concordance data, the one or more profiles including the profile associated with the classification;

determining a common security policy to apply to each of the nodes within the profile.

18. The system of claim 17, further comprising:

based on a user indication, removing a node having a classification corresponding to the classification of the profile from the profile;

changing the classification of the node to unassigned.

19. The method of claim 14, further comprising:

associating one or more IP addresses with at least one solution within the enterprise security management configuration tool;

for each of the profiles included within the enterprise network:

determining whether at least one of the one or more IP addresses associated with the profile corresponds to at least one of the one or more IP addresses associated with the at least one solution; and based on the at least one of the one or more IP addresses associated with the profile corresponding to at least one of the one or more IP addresses associated with the solution, adding the profile to the at least one solution;

affinitizing one or more of the plurality of profiles into one or more solutions based on network concordance data, the one or more solutions including the at least one solution associated with the one or more IP addresses;

determining a common security policy to apply to each of the nodes within the at least one solution.

20. The method of claim 14, further comprising:

associating a classification with at least one solution within the enterprise security management configuration tool;

for each of the profiles included within the enterprise network:

determining whether a classification of the profile corresponds to the classification associated with the at least one solution; and based on the classification of the profile corresponding to the classification associated with the solution, adding the profile to the at least one solution;

affinitizing one or more of the plurality of profiles into one or more solutions based on network concordance data, the one or more solutions including the at least one solution associated with the classification;

determining a common security policy to apply to each of the nodes within the at least one solution.

21. The method of claim 14, further comprising displaying a user interface of the enterprise security management configuration tool including the one or more profiles.

22. The method of claim 14, wherein determining a common security policy to each of the nodes within the profile is based on a security setting received at the user interface for the profile.

* * * * *